United States Patent
Masuda et al.

(10) Patent No.: US 6,628,431 B1
(45) Date of Patent: Sep. 30, 2003

(54) PICTURE READERS AND METHOD FOR CONTROLLING THE SAME

(75) Inventors: Minoru Masuda, Ishikawa (JP); Masashi Matsumoto, Ishikawa (JP); Tomohiro Sunasaki, Ishikawa (JP); Yasunori Miyauchi, Ishikawa (JP)

(73) Assignee: PFU Limited, Ishikawa (JP)

( * ) Notice: Subject to any disclaimer, the term of this patent is extended or adjusted under 35 U.S.C. 154(b) by 0 days.

(21) Appl. No.: 09/180,483

(22) PCT Filed: Mar. 12, 1998

(86) PCT No.: PCT/JP98/01039

§ 371 (c)(1),
(2), (4) Date: Mar. 10, 1999

(87) PCT Pub. No.: WO98/41009

PCT Pub. Date: Sep. 17, 1998

(30) Foreign Application Priority Data

| Mar. 12, 1997 | (JP) | ............................................. 9-057461 |
| Mar. 12, 1997 | (JP) | ............................................. 9-057462 |
| Mar. 14, 1997 | (JP) | ............................................. 9-061561 |

(51) Int. Cl.⁷ ................................................. H04N 1/04
(52) U.S. Cl. ...................................... 358/474; 358/475
(58) Field of Search ................................. 358/474, 475, 358/483, 486, 494, 496

(56) References Cited

U.S. PATENT DOCUMENTS 5,392,100 A  2/1995  Yoshida ...................... 355/235

FOREIGN PATENT DOCUMENTS

| EP | 0634675 A2 | * | 1/1995 | ............ G02B/6/00 |
| EP | 0814421 A2 |  | 12/1997 | ............ G06K/7/10 |
| JP | 64-859 |  | 1/1989 | ............ H04N/1/10 |
| JP | 1-133467 |  | 5/1989 | ............ H04N/1/10 |
| JP | 1-151873 |  | 6/1989 | ............ H04N/1/10 |
| JP | 2-29067 |  | 1/1990 | ............ H04N/1/10 |
| JP | 2-112067 |  | 9/1990 | ............ H04N/1/04 |
| JP | 3-60339 |  | 6/1991 | ............ G03B/27/62 |
| JP | 3-276958 |  | 12/1991 | ............ H04N/1/10 |
| JP | 404152316 | * | 5/1992 | ............ G02B/21/00 |
| JP | 5-167783 |  | 7/1993 | ............ H04N/1/04 |
| JP | 405292316 | * | 11/1993 | ............ H04N/1/40 |
| JP | 405308520 | * | 11/1993 | ............ H04N/1/40 |
| JP | 5-323474 |  | 12/1993 | ............ G03B/27/62 |
| JP | 6-111007 |  | 4/1994 | ............ H04N/1/04 |
| JP | 406189075 | * | 7/1994 | ............ H04N/1/40 |
| JP | 7-184002 |  | 7/1995 | ............ H04N/1/04 |
| JP | 7-193689 |  | 7/1995 | ............ H04N/1/19 |
| JP | 8-220647 |  | 8/1996 | ............ G03B/27/62 |
| JP | 8-265517 |  | 10/1996 | ............ H04N/1/10 |
| JP | 9-261424 |  | 10/1997 | ............ H04N/1/00 |
| JP | 10-4481 |  | 1/1998 | ............ H04N/1/04 |
| JP | 410257262 | * | 9/1998 | ............ H01N/1/10 |
| JP | 2000-022894 | * | 1/2000 | ............ G06T/1/00 |

* cited by examiner

*Primary Examiner*—Jerome Grant, II

(57) ABSTRACT

An image reader is composed of a read unit 2 provided with a contact member 21 which abuts an original bed 11 of a flat bed unit 1; and a pressing element 30 for causing the read unit 2 and the original bed 11 to press against each other. Also, the image reader is composed of an apparatus body 50 including a read unit 102 and an original bed 51; and an original cover 42 including a light source 43 and a diffusion plate 45 and attached to the apparatus body 50 in such a manner as to be freely opened and closed. The distance between a translucent original 41 placed on the original bed 51 and the light source 43 is variable according to the thickness of the translucent original 41. Further, in the image reader, a cumulative difference between the movement of the optical unit 102 and the movement of a light source unit 44 is previously read; and, at the time of start of scanning for read, the relative position of the optical unit 102 and the light source unit 44 is shifted in reverse in relation to the direction of the cumulative difference.

17 Claims, 18 Drawing Sheets

(PLAN VIEW)  (SECTIONAL VIEW)

(PLAN VIEW)  (SECTIONAL VIEW)

PICTURE READERS AND METHOD FOR CONTROLLING THE SAME

TECHNICAL FIELD

The present invention relates to an image reader and a method for controlling the image reader. More particularly, the invention relates to an image reader capable of reading an image and a translucent original such as photographic film at high quality through self-advancement of a read unit provided with a reducing optical system employing an image-forming lens, as well as to a method for controlling the image reader.

BACKGROUND ART

Conventionally, a flat-bed-type image (or original) reader for reading an image through self-advancement of a read unit provided with a reducing optical system employing an image-forming lens is known as an image reader or an original reader (i.e., scanner) for reading, as image information, character information and graphic information present on a medium such as paper.

FIG. 18 shows a conventional flat-bed-type image reader. As shown in FIGS. 18A and 18B, the flat-bed-type image reader is composed of a flat bed unit 151 and a read unit 152.

The flat bed unit 151 has an original bed 161 for placement of an original, a guide rail 162, and a reference shaft 171. The read unit 152 has a reducing optical system and a contact member 153. The reducing optical system includes a fight source 175, reflecting mirrors 176, an image-forming lens 177, and a CCD 178. The contact member 153 includes a sliding member or a rolling member displaced so as to face the guide rail 162.

When an original is scanned, the read unit 152 is driven by an unillustrated driving belt and caused to travel on the reference shaft 171. A side of the read unit 152 which faces the guide rail 162 slides on a surface of the guide rail 162. The surface of the guide rail 162 is finished to a high degree of flatness.

Accordingly, in the conventional image reader of FIG. 18, a positional error S may arise between the original bed 161 and the read unit 152, as shown in FIG. 18C, due to various factors, such as the flatness and attachment accuracy of the guide rail 162 and the distortion of the entire image reader, including the flat bed unit 151 and the read unit 152. When the error δ arises, the optical path length between the original bed 161 and the CCD 178 becomes unstable.

Meanwhile, in recent image readers, the read unit 152 provided with a reducing optical system employing an image-forming lens has implemented higher resolution. In order to implement higher resolution, as shown in FIG. 19, the image-forming lens is forced to employ a shallow depth of field and a shallow depth of focus.

Accordingly, the conventional image reader involves the following problems.

(1) An unstable optical path length causes impairment in reading accuracy.
(2) Defocus results from a failure of an image to fall within the depth of field.
(3) Distortion of the entire image reader brings about a positional shift (skew) between a read start position and a read end position.

In an image reader (scanner) having a function to read a translucent original made of, for example, a transparent film, a light source for irradiating an original with light and a light-receiving sensor for receiving image-representing light which has passed through the original are moved in a mutually facing manner, thereby reading image information from the original. In order to read image information of the translucent original at high quality, an appropriate positional relation must be maintained between the light source for irradiating the original with light and the light-receiving sensor for receiving image-representing light which has passed through the original.

FIG. 20 shows a conventional flat-bed-type image reader capable of reading a translucent original 201. As shown in FIG. 20, the image reader is composed of a reader body 260 and a freely-openable original cover 252 attached to the reader body 260.

The reader body 260 includes a read unit 262 provided with reflecting mirrors 263, an image-forming lens 264, and a CCD 265. The read unit 262 is driven by an unillustrated driving belt and caused to travel on a reference shaft 266 in a subscanning direction. The reader body 260 also includes an original bed 261 for placing a translucent original 201 thereon.

The original cover 252 is configured such that a light source unit 254 having a light source 253 is driven by an unillustrated driving element and caused to travel synchronously with the travel of the read unit 262. The original cover 252 also includes a diffusion plate 255. The diffusion plate 255 is disposed so as to face the original bed 261 and is adapted to diffuse light from the light source 253 to thereby absorb a positional deviation of the light source 253 from the reflecting mirrors 263.

When the translucent original 201 is to be read, the translucent original 201 is placed on the original bed 261, and then the original cover 252 is closed. Subsequently, the translucent original 201 is irradiated with light from the light source 253. The light passes through the original bed 261 and reaches the CCD 265 via the reflecting mirrors 263 and the image-forming lens 264, to thereby form an image on the CCD 265. The thus-formed image of the translucent original 201 is converted to image data by the CCD 265.

FIG. 21 shows a detailed structure of the original cover 252. The original cover 252 has a guide rail 280 extending in the subscanning direction and serving as a driving element for driving the light source unit 254. A rack 281 is formed at one side of the guide rail 280. To a unit frame 279 of the light source unit 254 are attached the light source 253 and driving elements for the light source unit 254, such as a pulse motor 287 and gears 283 and 284. Further, the light source unit 254 has a pinion 282 serving as its driving element. The pinion 282 is journaled to be meshed with the rack 281. The pinion 282 is driven by the pulse motor 287 via the gears 283 and 284.

Two slide shoes 285 are provided on the light source unit 254 such that the slide shoes 285 are located on one side of the guide rail 280 opposite the rack-formed side thereof. The slide shoes 285 are pressed by means of pressing elements 286 so that the slide shoes 285 come in contact with the guide rail 280 at two positions located on opposite sides with respect to the meshing position between the rack 281 and the pinion 282. Thus, the two slide shoes 285 define the orientation of the light source unit 254.

Contact members 278 each formed of, for example, a sliding member are provided on opposite sides of the unit frame 279 of the light source unit 254 such that they abut the original cover 252. One contact member 278 presses a cover frame 256 of the original cover 252 via a pressing element 286. Thus, the light source unit 254 travels on the basis of the cover frame 256. The diffusion plate 255 is fixed on the cover frame 256 by means of, for example, screws.

The translucent original 201 to be scanned by the flatbed-type image reader assumes the following forms: a naked film 201a as shown in FIG. 22A; and the film 201a accommodated in a film folder or case 201b as shown in FIG. 22B. The film 201a is about 0.2 to 0.3 mm thick, and the film folder 201b is about 2 to 3 mm thick.

When the above-mentioned translucent original 201 placed on the original bed 261 is thick, the original cover 252 may be unable to be closed to a predetermined position. By contrast, when the translucent original 201 is thin, an improper assembling accuracy of an attachment portion of the original cover 252 may cause a failure to establish contact between the original cover 252 and the translucent original 201 in the vicinity of the attachment portion. In these cases, the distance between the light source 253 and the translucent original 201 varies along a main scanning direction. Also, when the original cover 252 is distorted in the Z direction of FIG. 20A, the distance (optical path length) between the light source 253 and the translucent original 201 varies (this distance is also an optical path length, whose definition is different from that of the previously mentioned optical path length). As a result, the quantity of light received by the CCD 265 is difficult to hold constant. Therefore, in order to read information from the translucent original 201 through movement of the light source 253, the attachment accuracy of the original cover 252 and the accuracy of a light-source-operating unit must be increased in order to make the quantity of light received by the CCD 265 constant.

Accordingly, the conventional flat-bed-type image reader capable of reading the translucent original 201 involves the following problems.

(4) When various kinds of translucent originals 201 having different thicknesses are to be read or when the original cover 252 is distorted, the distance (and as a result, the optical path length) between the light source 253 and the translucent original 201 varies, thus failing to maintain the quantity of light received by the CCD 265 at a constant level.

(5) The attachment accuracy of the original cover 252 and the accuracy of the light-source-operating unit must be high.

(6) Because of the above (4) and (5), there cannot be implemented an inexpensive mechanism capable of uniformly and stably reading an image.

An example structure of a conventional image reader having a function to read a translucent original formed of, for example, a transparent film will next be described with reference to FIG. 23. A light source unit 362 accommodated in an upper housing 365 has a light source 361. Light emitted from the fight source 361 passes through an original 375 placed on a transmission glass 373 provided on a top surface of a lower housing 374. The direction of the transmitted light is changed by a mirror provided in an optical unit 369 such that the light reaches a CCD 368 via a condenser lens 367.

The light source unit 362 is moved along the original 375 by means of a driving belt 370a, which is driven by a driving pulley 371a and a follower pulley 372a. Also, synchronously with the movement of the light source unit 362, the optical unit 369 is moved along the original 375 by means of a driving belt 370, which is driven by a driving pulley 371 and a follower pulley 372.

The relationship between the optical axis of light emitted from the light source 361 and the quantity of light received by the CCD 368 will next be described with reference to FIG. 25. According to the curve of FIG. 25, when the optical axis of light emitted from the light source 361 is aligned with the optical axis of the CCD 368, the optical axis of the light is positioned at C0, and the quantity of light detected by the CCD 368 becomes 100%; and when the optical axis of light emitted from the light source 361 deviates to a position C1, the quantity of light detected by the CCD 368 changes to K1%. The curve of FIG. 25 shows the following: there exists a region in the vicinity of the position C0 in which the quantity of light received by the CCD 368 varies by a small amount with deviation of the optical axis of light. For example, when the optical axis of light deviates to the position C1, the received quantity of light varies to become K1%. By contrast, when deviation of the optical axis of light falls outside the above region of gentle variation, the quantity of light received by the CCD 368 drops greatly. For example, when the optical axis of light deviates greatly to position C4, the received quantity of light is varied to K3%.

Thus, in the image reader for reading a translucent original, in order to maintain high image quality without decreasing the quantity of light detected by the CCD 368, the following measures must be implemented, in addition to measures against the above-mentioned problems (4) to (6):

(7) To align the optical axis of light emitted from the light source 361 with the center of the CCD 368 of a light receiving unit.

(8) To prevent deviation of the optical axis of light emitted from the light source 361 during scanning of the original 375.

In order to align the optical axis of light emitted from the light source 361 with the center of the CCD 368 of the light receiving unit as mentioned above in (7), the conventional image reader is subjected to sufficient adjustment of its optical axis in a manufacturing process and is then shipped. In order to prevent deviation of the optical axis during scanning of an original as mentioned above in (8), the conventional image reader employs a pulse motor or a like device as a drive for enabling the optical unit 369 to perform scanning, thereby attaining accurate positional control during scanning. Further, the conventional image reader employs a pulse motor or a like device as a drive for enabling the light source unit 362 to perform scanning, thereby ensuring that the light source unit 362 follows the scanning motion of the optical unit 369 at sufficiently high accuracy.

Through employment of the above measures, there can be obtained an image reader having a practically sufficient optical-axis alignment. However, since a driving system including the driving pulley 371a, the follower pulley 372a, and the driving belt 370 must be accommodated within the upper housing 365, the upper housing 365 becomes large. Since an operator must open and close the upper housing 365 for scanning, an increase in the size of the upper housing 365 causes inconvenience to the operator.

As shown in FIG. 24, the optical unit 369 and the light source unit 362 may be integrated into a single unit to thereby fix the relative position between the optical unit 369 and the light source unit 362. However, in this case, opening and closing the upper housing 365 becomes difficult, and use of a reading mechanism which utilizes reflected light becomes difficult. As a result, the application of the image reader is significantly limited.

DISCLOSURE OF THE INVENTION

An image reader of the present invention reads an image through self advancement of a read unit provided with a reducing optical system employing an image-forming lens. The image reader comprises a read unit provided with a contact member which abuts an original placement bed of a flat bed unit, and a pressing element for causing the read unit and the original bed to press against each other.

An image reader of the present invention is of a flat-bed-type and comprises an apparatus body and an original cover. The apparatus body includes a read unit and an original bed. The original cover includes a light source and a diffusion plate and is attached to the apparatus body in such a manner as to be freely opened and closed. The distance between a translucent original placed on the original bed and the light source is variable according to the thickness of the translucent original.

The present invention provides a method for controlling an image reader including a light source unit and an optical unit. The light source unit has a light source for irradiating an original placed on a transmission glass with light. The optical unit receives light which has passed through the original. The method comprises the steps of previously reading a cumulative difference between the movement of the optical unit and the movement of the light source unit; and shifting, at the time of start of scanning for read, the relative position of the optical unit and the light source unit in reverse in relation to the direction of the cumulative difference so as to reduce an optical-axis deviation which arises during scanning.

BEST MODE FOR CARRYING OUT THE INVENTION

First Embodiment

The first embodiment employs the following means. When an original is scanned, a read unit slides on an original placement bed of a flat bed unit while always abutting the original bed. As a result, the distance between the read unit and the original bed is held constant. Thus, when the original is scanned, the optical path length between the original bend and a CCD is stabilized.

Figure 1:
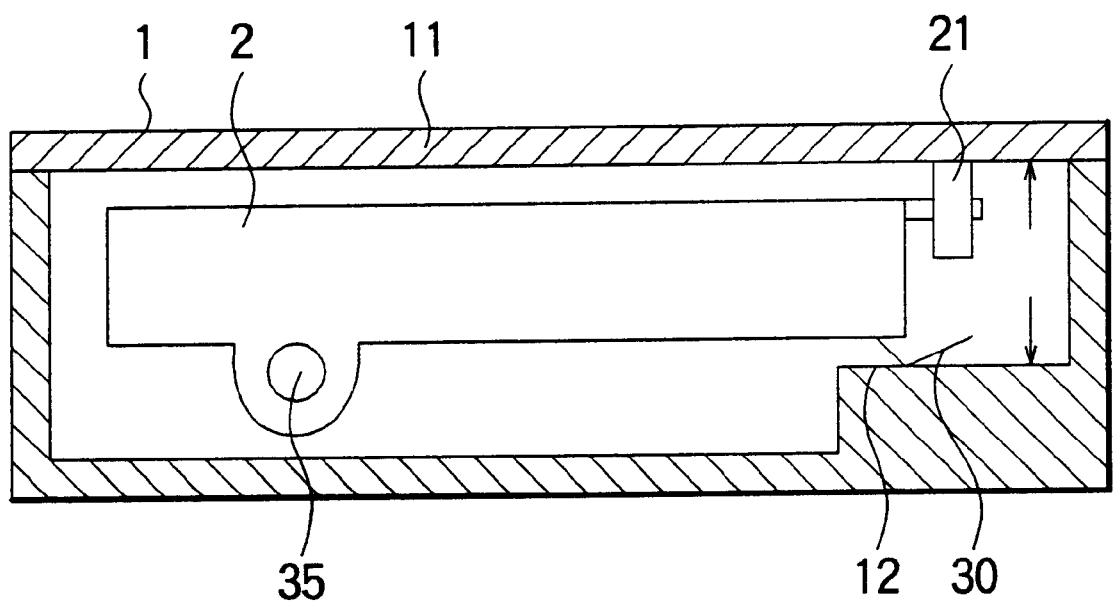
FIG. 1 is a structural view showing the principle of a first embodiment.
Figure 2A:
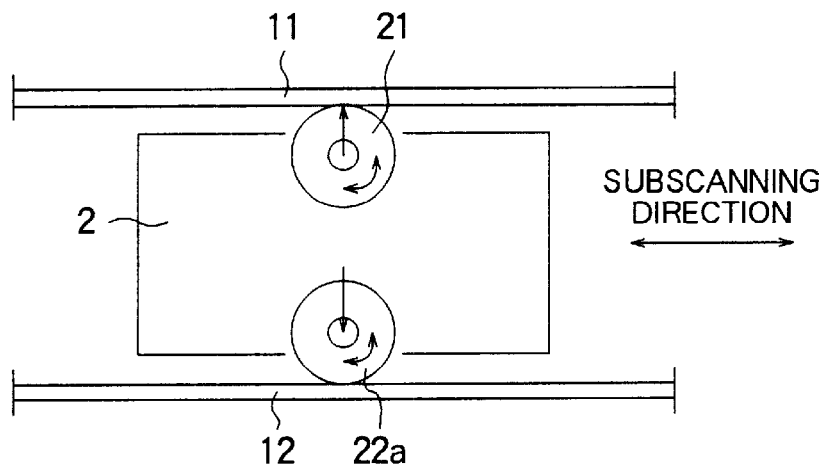
FIGS. 2A–2D are views for explaining the first embodiment.
Figure 2B:
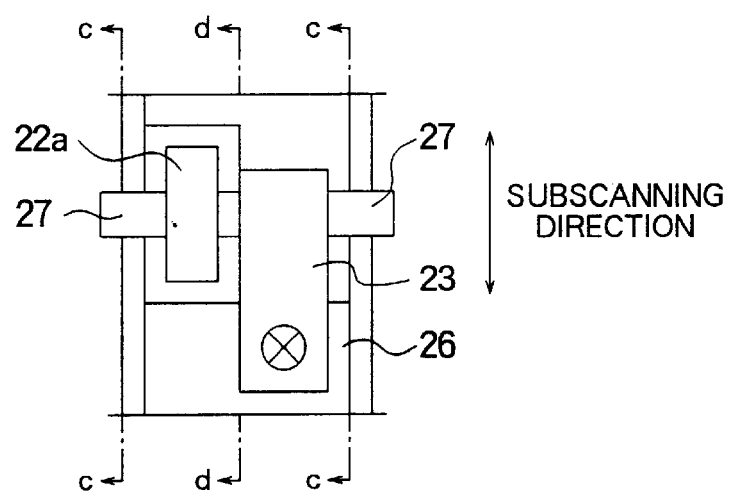
Figure 2C:
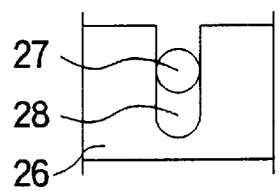
Figure 2D:
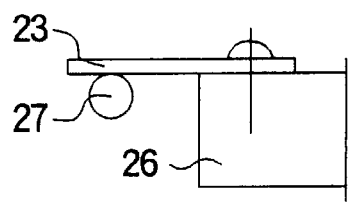

The first embodiment will next be described. As shown in FIG. 1, an image reader reads an image through self-advancement of a read unit 2 provided with a reducing optical system employing an image-forming lens. The image reader includes the read unit 2 provided with a contact member 21 which abuts an original bed 11 of a flat bed unit 1 for placement of an original and a pressing element 30 for causing the read unit 2 and the original bed 11 to press against each other.

Figure 5:
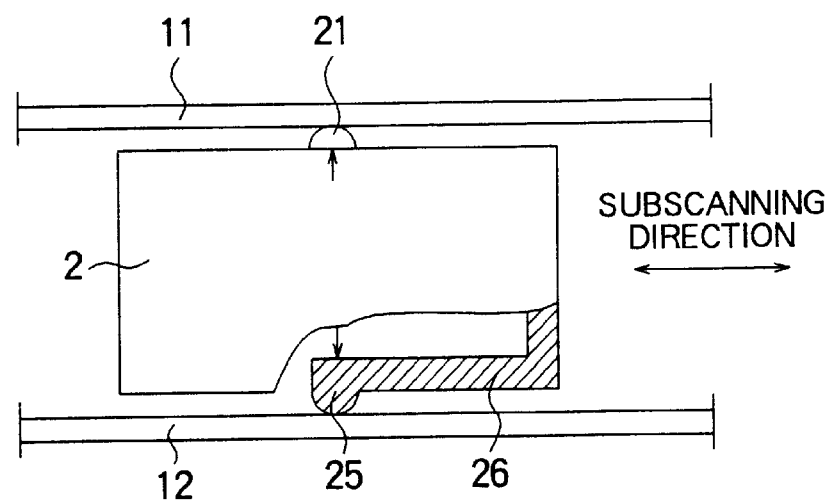
FIG. 5 is a view for explaining the first embodiment.
Figure 6:
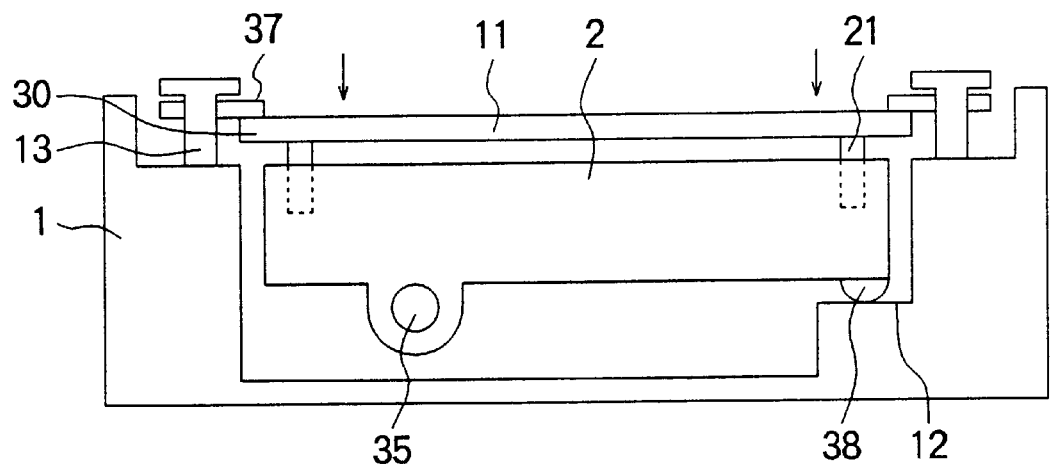
FIG. 6 is a view for explaining the first embodiment.

Further, as shown in FIG. 2, the read unit 2 preferably includes a contact member 22a that abuts under pressure a guide rail 12 of the flat bed unit 1. Also, as shown in FIGS. 2 and 3, it is effective to support a contact member 22a in a rotatable and slidable manner to the read unit 2 and to press the contact member 22a toward the guide rail 12 by a spring member 23. Preferably, as shown in FIG. 4, a contact member 22b is attached to a spring member 24 which applies a pressing force toward the guide rail 12 of the read unit 2. Preferably, again, as shown in FIG. 5, a contact member 25 made of an elastic synthetic resin as part of a frame 26 of the read unit 2 is pressed against the guide rail 12. Also, preferably, as shown in FIG. 6, the original bed 11 is vertically slidably attached to the flat bed unit 1. Further, as shown in FIG. 6, it is also effective to provide the flat bed unit I with support posts 13 for defining the position of the original bed 11 in a main scanning direction and in a subscanning direction and to attach the original bed 11 to the support posts 13.

The above-mentioned first embodiment effects the following action. Since the read unit 2 scans an original while always being brought in contact with the original bed 11 by means of a pressing element, the distance between the read unit 2 and the original bed 11 is always held constant. Accordingly, the optical path length between the original bed 11 and a CCD becomes stable, thereby eliminating defocus which would otherwise occur during scanning. Further, even when the entire image reader is distorted, there is eliminated a positional shift (skew) between a read start position and a read end position which would otherwise result.

Further, since the guide rail 12 does not need to have particularly high surface or attachment accuracy, costs are reduced. Even when the surface of the guide rail 12 is distorted, the optical path length between the original bed 11 and the CCD is stable. Also, the image reader itself does not need to have a particularly high strength. Thus, the image reader can be made of inexpensive materials. Further, the contact member provides stable contact between the read unit 2 and the flat bed unit 1, and thus the read unit 2 travels stably during scanning, thereby preventing transmission of vibration from a motor which would otherwise cause jitters. Also, through integral formation of the contact member and the pressing member 30, addition of a particular part is not required, thereby reducing the number of parts. When an original is scanned, the original bed 11 always abuts the read unit 2 by virtue of its own weight. Thus, the distance between the read unit 2 and the original bed 11 is always held constant. Accordingly, the optical path length between the original bed 11 and the CCD becomes stable, thereby eliminating defocus which would otherwise occur during scanning.

The first embodiment will next be described in detail with reference to FIGS. 1 to 6. In the below description, the same features are denoted by common symbols, and their detailed description may be omitted.

Figure 18A:
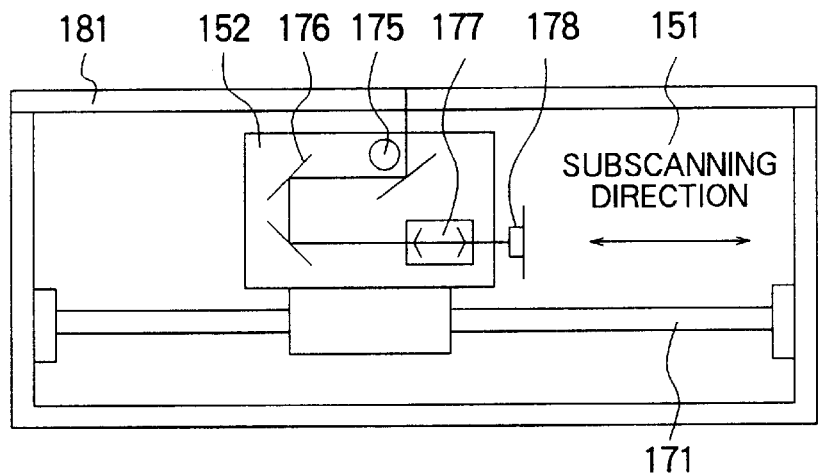
FIGS. 18A–18C is a view for explaining the prior art.
Figure 18B:
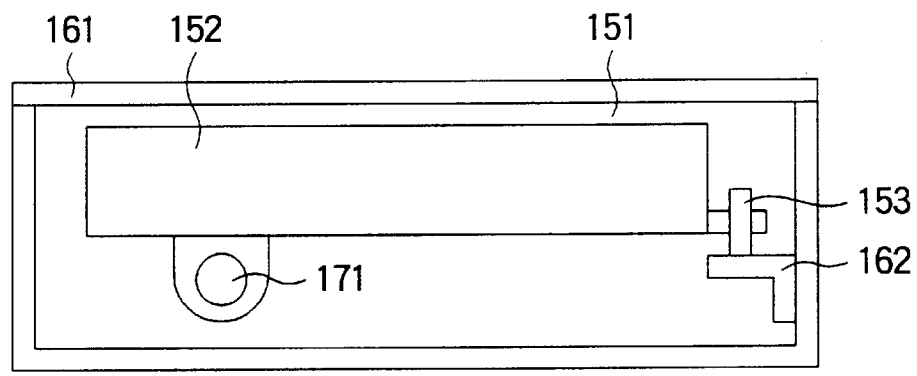
Figure 18C:
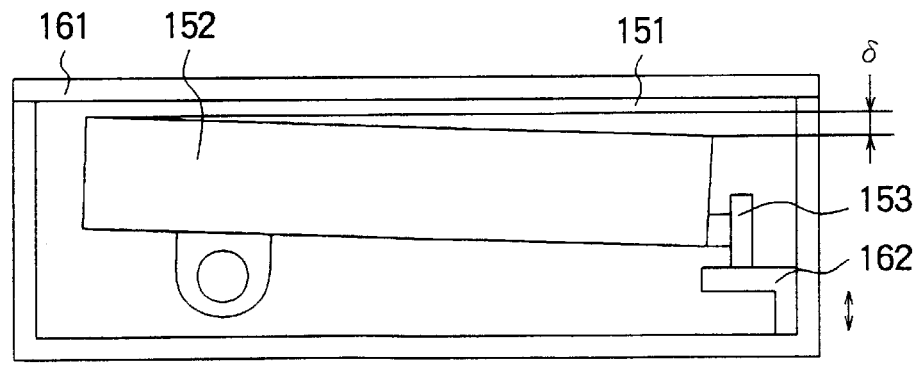
Figure 19:
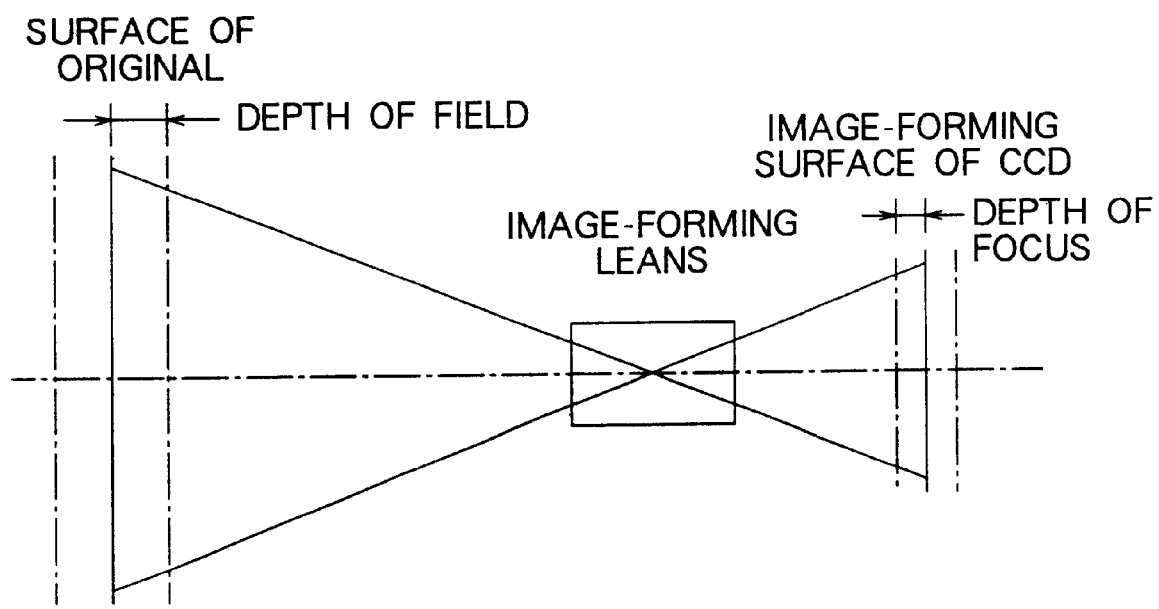
FIG. 19 is a view for explaining the depth of field and the depth of focus.

FIG. 1 is a structural view showing the principle of the first embodiment. As shown in FIG. 1, a flat-bed-type image reader (flat bed scanner) is composed of the flat bed unit 1 and the read unit 2. The flat bed unit 1 includes the original bed 11, the guide rail 12, and a reference shaft 35. The read unit 2 has an unillustrated optical system composed of a light source, a reflecting mirror, an image-forming lens, and a CCD. The optical system of the read unit 2 is similar to the reducing optical system of the read unit 152 of the conventional image reader shown in FIG. 18.

The read unit 2 has the contact member 21 formed of, for example, a rolling member and abutting the original bed 11. The flat bed scanner has the pressing element 30 for causing the read unit 2 and the original bed 11 to press against each other. The pressing element 30 may be provided either on the read unit 2 or on the flat bed unit 1.

When an original is scanned, the read unit 2 is driven by an unillustrated driving belt and caused to travel on the reference shaft 35. The read unit 2 slides on the top surface of the guide rail 12 and the lower surface of the original bed 11. As a result of the read unit 2 sliding on the top surface of the guide rail 12, the pressing element 30 causes the read unit 2 to slide on the lower surface of the original bed 11 while always abutting the surface.

FIG. 2 is a view for explaining the first embodiment. FIG. 2A is a side view (right-hand side of FIG. 1); FIG. 2B is a plan view; FIG. 2C is a sectional view taken along the line c—c of FIG. 2B; and FIG. 2D is a sectional view taken along the line d—d of FIG. 2B.

As shown in FIG. 2, the read unit 2 has the contact member 22a formed of, for example, a rolling member. The contact member 22a abuts under pressure the guide rail 12 of the flat bed unit 1. As shown in FIG. 2C, the contact member 22a has a shaft 27, which is slidably and rotatably fitted into grooves 28 formed in the frame 26 of the read unit 2. As shown in FIGS. 2B and 2D, a spring member 23 formed of, for example, a leaf spring is attached to the frame 26 so as to press a substantially central portion of the shaft 27 to thereby press the contact member 22a against the guide rail 12.

Figure 3A:
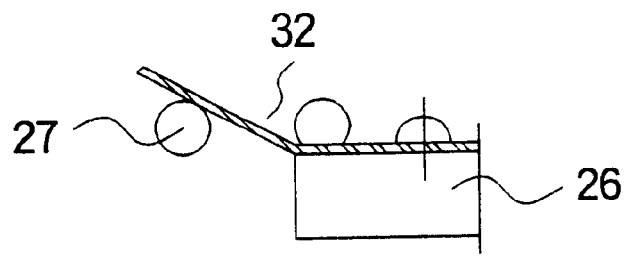
FIGS. 3A–3C are views for explaining the first embodiment.
Figure 3B:
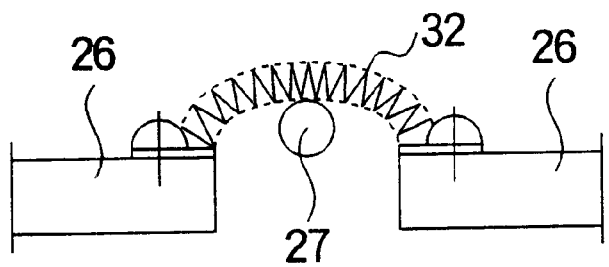
Figure 3C:
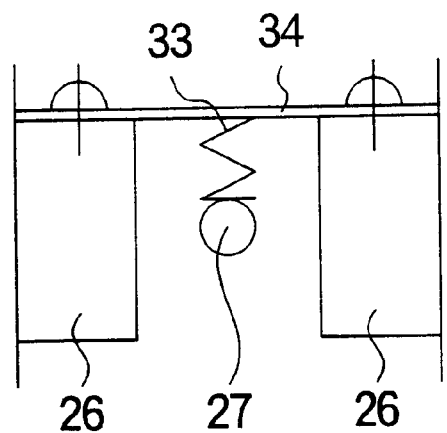

FIG. 3 is a view for explaining the first embodiment. The spring member for pressing the contact member 22a (the shaft 27 thereof) toward the guide rail 12 may be a torsion coil spring 31 as shown in FIG. 3A, a tension spring 23 as shown in FIG. 3B, or a compression spring 33 disposed between the shaft 27 and a fixation plate 34 attached to the frame 26 as shown in FIG. 3C.

Figure 4A:
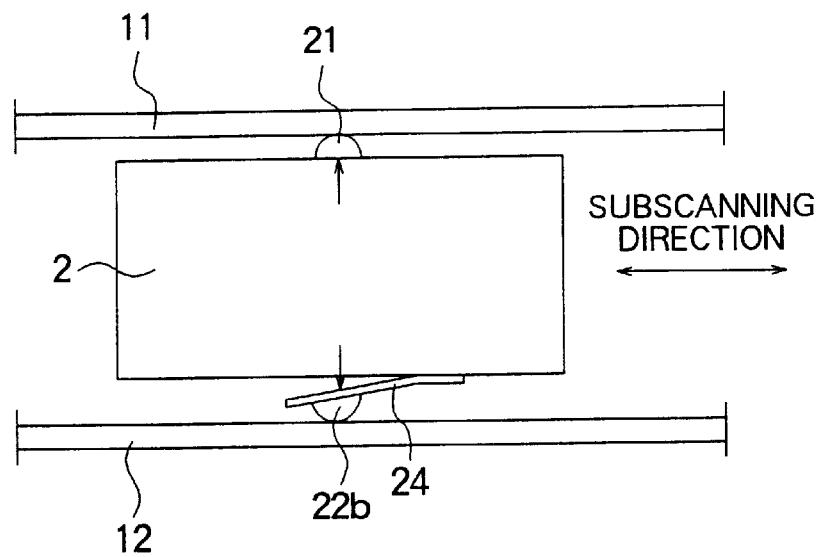
FIGS. 4A & 4B are views for explaining the first embodiment.
Figure 4B:
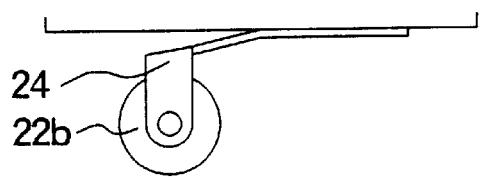

FIG. 4 is a view for explaining the first embodiment. As shown in FIG. 4, a spring member 24 formed of, for example, a leaf spring for pressing the guide rail 12 is attached to a bottom surface of the read unit 2 which faces the guide rail 12. Further, a contact member 22b is attached to the spring member 24. The contact member 22b may be a sliding member as shown in FIG. 4A or a rolling member as shown in FIG. 4B.

FIG. 5 is a view for explaining the first embodiment. As shown in FIG. 5, the frame 26 of the read unit 2 is made of an elastic resin material. An integral portion of the frame 26 is formed so as to face the guide rail 12 and has a spring property, thereby pressing the guide rail 12. Also, the integral portion includes a contact member 25 which is formed at a tip section thereof.

FIG. 6 is a view for explaining the first embodiment. As shown in FIG. 6, the original bed 11 is vertically slidably attached to the flat bed unit 1 while being in contact with the contact members 21 of the read unit 2. The flat bed unit 1 has the support posts 13, which define the positions of the original bed 11 in the main scanning and subscanning directions. A fixture frame 37 to which the original bed 11 is fixedly attached is attached to the support frames 13. The original bed 11 may be directly attached to the support frames 13. A contact member 38 formed of, for example, a sliding member is attached to a bottom surface of the read unit 2. The contact member 38 is brought into contact with the guide rail 12 of the flat bed unit 1.

According to the first embodiment as described above, the following effects are yielded, In the image reader for reading an image through self advancement of the read unit 2 provided with a reducing optical system employing an image-forming lens, the read unit 2 has the contact member 21 abutting the original bed 11 of the fast bed unit 1, and the pressing element 30 causes the read unit 2 and the original bed 11 to press against each other. Accordingly, the read unit 2 scans an original while being always brought into contact with the original bed 11 by the pressing element 30. Thus, the distance between the read unit 2 and the original bed 11 is always held constant. Hence, the optical path length between the original bed 11 and the CCD becomes stable, thereby eliminating defocus which would otherwise occur during scanning. Further, even when the entire image reader is distorted, there can be eliminated a positional shift (skew) between a read start position and a read end position which would otherwise result.

Further, since the read unit 2 has the contact member 38 which abuts under pressure the guide rail 12 of the flat bed unit 1, the guide rail 12 does not need to have particularly high surface or attachment accuracy. Thus, manufacturing cost can be reduced. Even when the surface of the guide rail 12 is distorted, the optical path length between the original bed 11 and the CCD is stable. Also, the image reader itself does not need to have a particularly high strength. Thus, the image reader can be made of inexpensive materials.

Also, the contact member 38, which is attached to the read unit 2 in a rotatable and slidable manner, is pressed against the guide rail 12. Alternatively, the contact member 38 is attached to the spring member which is provided on the read unit 2 for pressing the guide rail 12. As a result, since the contact member 38 effects stable contact between the read unit 2 and the flat bed unit 1, the read unit 2 travels stably during scanning, thereby preventing transmission of vibration from the motor which would otherwise cause jitters.

Alternatively, the contact member 21 is formed as a portion of the frame of the read unit 2 made of an elastic resin material, so as to be pressed against the guide rail 12. As a result, the pressing element 30 can be formed without addition of a particular part; thus, the number of parts can be reduced.

Alternatively, a surface for placement of an original is vertically slidably attached to the flat bed unit 1. The flat bed unit 1 has the support posts 13 for defining the positions of the surface for placement of an original in the main scanning and subscanning directions. The original bed 11 is attached to the support posts 13. As a result, when an original is scanned, the original bed 11 always abuts the read unit 2 by virtue of its own weight. Thus, the distance between the read unit 2 and the original bed 11 is always held constant. Accordingly, the optical path length between the original bed 11 and the CCD becomes stable, thereby eliminating defocus which would otherwise occur during scanning. Further, even when the entire image reader is distorted, there can be eliminated a positional shift (skew) between a read start position and the read end position which would otherwise result.

Second Embodiment

The second embodiment employs the following means. In a flat-bed-type image reader for reading a translucent original, the distance between a light source and a translucent original placed on an original bed is set based on the thickness of the translucent original. As a result, even when various translucent originals having different thicknesses are to be read or when an original cover is distorted, the distance between the light source and the translucent original is always held constant, thereby maintaining the quantity of light received by a CCD at a constant level.

Figure 7:
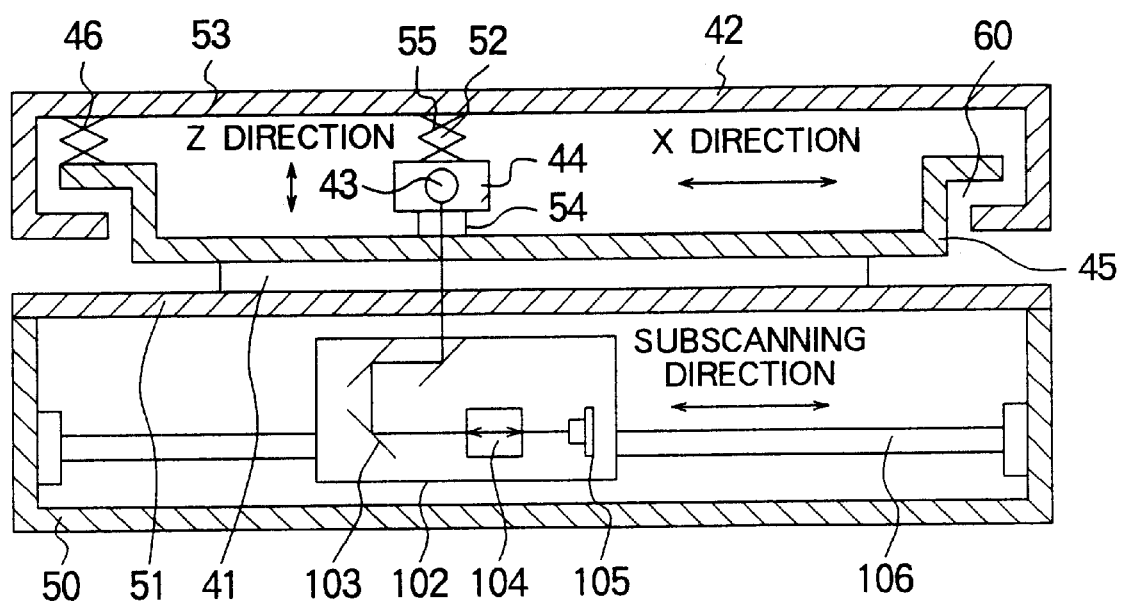
FIG. 7 is a view showing the principle of mechanism of a second embodiment.

The present invention is carried out in the following second embodiment. As shown in FIG. 7, the flat-bed-type image reader is composed of an apparatus body 50 (or a flat bed unit 1) and an original cover 42. The apparatus body 50 includes a read unit 102 (or the read unit 2) and an original bed 51. The original cover 42 includes a light source 43 and a diffusion plate 45 and is attached to the apparatus body 50 such that the original cover 42 can be freely opened and closed. The distance between the light source 43 and a translucent original 41 placed on the original bed 51 is varied according the thickness of the translucent original 41.

Figure 11:
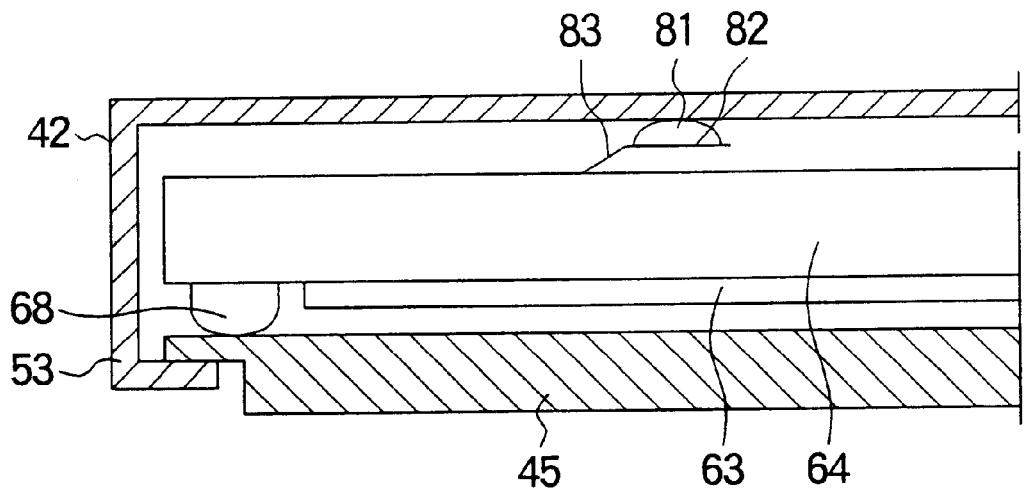
FIG. 11 is a view for explaining the second embodiment.

Preferably, the diffusion plate 45 is movable toward the light source 43. Also, preferably, the diffusion plate 45 is attached to the cover frame 53 of the original cover 42 such that a gap 60 is defined by the cover frame 53 and the diffusion plate 45. It is also effective to provide the original cover 42 with pressing elements 46 for pressing the diffusion plate 45 toward the original bed 51. Preferably, a light source unit 44 having the light source 43 travels while abutting the diffusion plate 45. Further, preferably, the light source unit 44 has contact members 54, which abut the diffusion plate 45, at its opposite ends as viewed along the main scanning direction. Also, it is effective to provide the light source unit 44 with a pressing element 52 composed of a spring 55 for pressing the diffusion plate 45. Alternatively, as shown in FIG. 11, the light source unit 64 desirably has a pressing member 82 located at its substantially central portion as viewed along the main scanning direction. The pressing member 82 includes a spring 83 having a contact member 81. The spring 83 is disposed between and presses the cover frame 53 and the light source unit 64.

The above-mentioned second embodiment effects the following action. Since the light source 43 is arranged on the basis of the translucent original 41 placed on the original bed 51, the quantity of light impinging on the translucent original 41 becomes stable, thereby holding the quantity of light received by the CCD at a constant level. Further, the diffusion plate 45 abuts the translucent original 41 under its own weight, thereby maintaining a constant distance between the light source 43 and various kinds of translucent originals 41. Further, the diffusion plate 45 abuts the translucent original 41 under an external pressure. Even when the translucent original 41 warps against the weight of the diffusion plate 45, a constant distance can be maintained between the light source 43 and various kinds of translucent originals 41 by virtue of the external pressure. Since the light source unit 44 having the light source 43 is adapted to travel while abutting the diffusion plate 45, the light source unit 44 can travel on the basis of the diffusion plate 45. Accordingly, the quantity of light impinging on the translucent original 41 becomes stable, thereby holding the quantity of light received by the CCD at a constant level. Further, the light source unit 44 can travel on the basis of the diffusion plate 46. In addition, the diffusion plate 45 abuts the translucent original 41 under an external pressure. Even when the translucent original 41 warps against the weight of the diffusion plate 45, the constant distance can be maintained between the light source 43 and various kinds of translucent originals 41 by virtue of the external pressure.

The second embodiment will next be described in detail with reference to FIGS. 7 to 11, In the below description, the same features are denoted by common symbols, and their detailed description may be omitted.

Figure 20A:
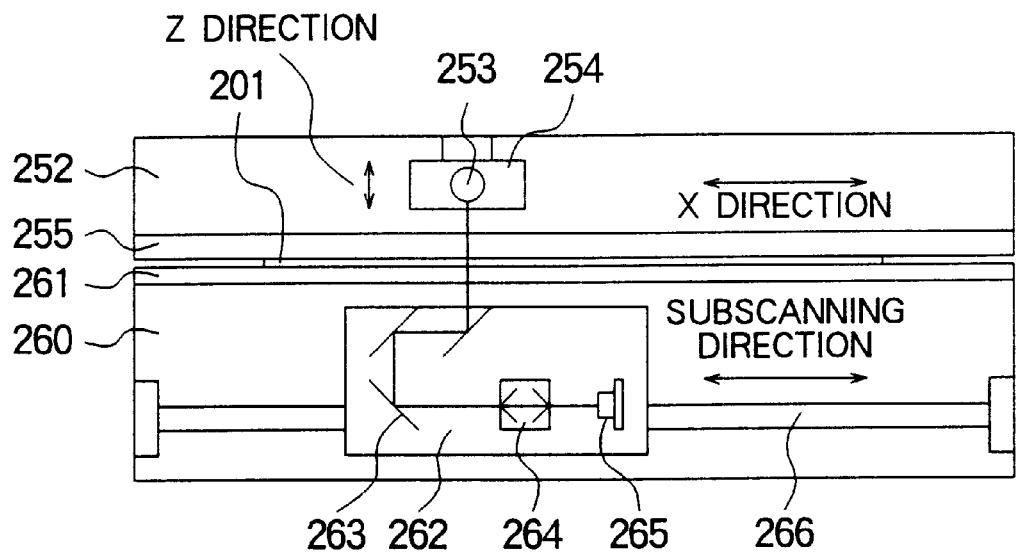
FIGS. 20A & 20B is a view for explaining the prior art.
Figure 20B:
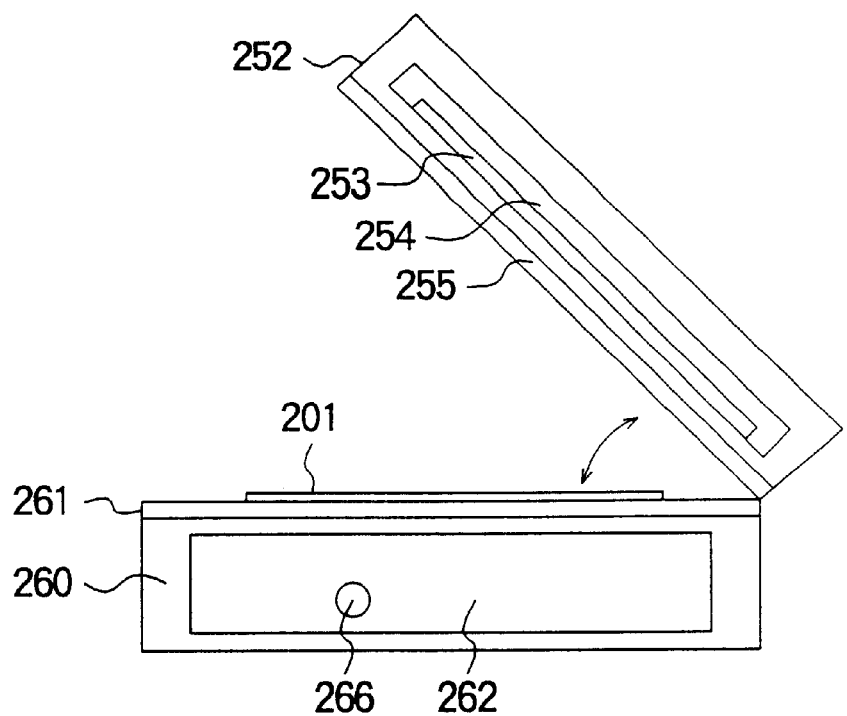

FIG. 7 is a view showing the principle of mechanism of the second embodiment. As shown in FIG. 7, the flat-bed-type image reader capable of reading the translucent original 41 is composed of the apparatus body 50 and the original cover 42, which is attached to the apparatus body 50 such that the original cover 42 can be freely opened and closed. The apparatus body 50 includes the read unit 102, which, in turn, includes reflecting mirrors 103, an image-forming lens 104, and a CCD 105. Being driven by an unillustrated driving belt, the read unit 102 travels on a reference shaft 106 in the subscanning direction. The apparatus body 50 also includes the original bed 51 for placing the translucent original 41 thereon. The above-described structure is similar to that of the conventional image reader of FIG. 20.

The diffusion plate 45 is disposed within the original cover 42 in such a manner as to be movable in the Z direction while facing the original bed 51, thereby absorbing a positional deviation of the light source 43 from the reflecting mirror 103 through diffusion of light emitted from the light source 43. Preferably, the original cover 42 is configured such that the light source unit 44 having the light source 43 is caused, by an unillustrated driving element, to travel synchronously with the travel of the read unit 102 and on the basis of the diffusion plate 45.

The gap 60 is formed in a section of engagement between the diffusion plate 45 and the cover frame 53 of the original cover 42. Further, the original cover 42 has the pressing elements 46 for pressing the diffusion plate 45 toward the original base 51.

Also, the light source unit 44 has the contact members 54 at its opposite ends as viewed along the main scanning direction. The contact members 54 are each formed of, for example, a sliding member and travel while abutting the diffusion plate 45. The light source unit 44 has the pressing element 52 formed of the spring 55 for pressing the diffusion plate 45.

Figure 8:
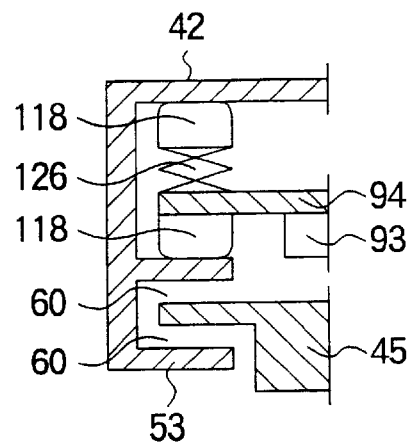
FIG. 8 is a view for explaining the second embodiment.
Figure 21:
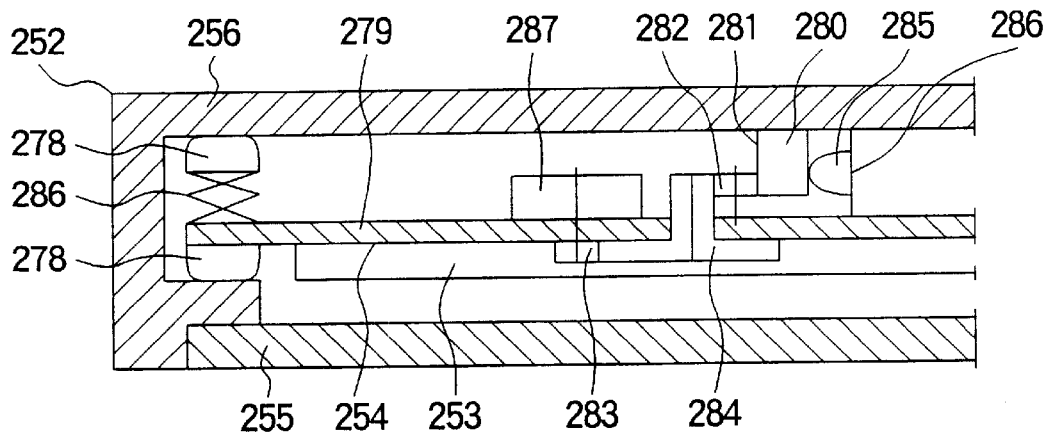
FIG. 21 is a view showing the structure of the prior art.
Figure 22A:
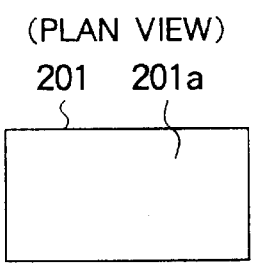
FIGS. 22A–22C are views for explaining the prior art.
Figure 22B:
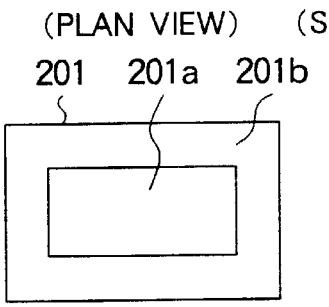
Figure 22B:
Figure 22C:
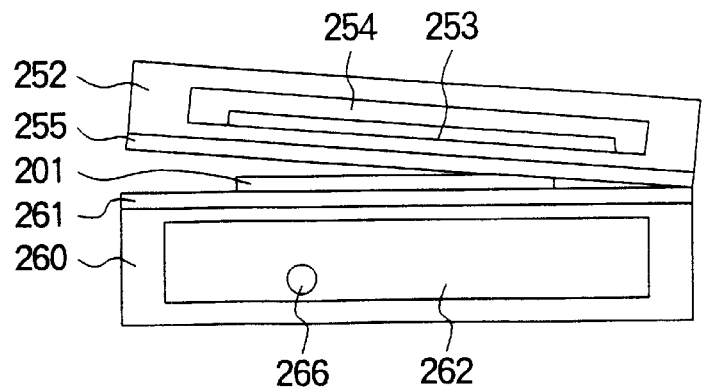
Figure 23:
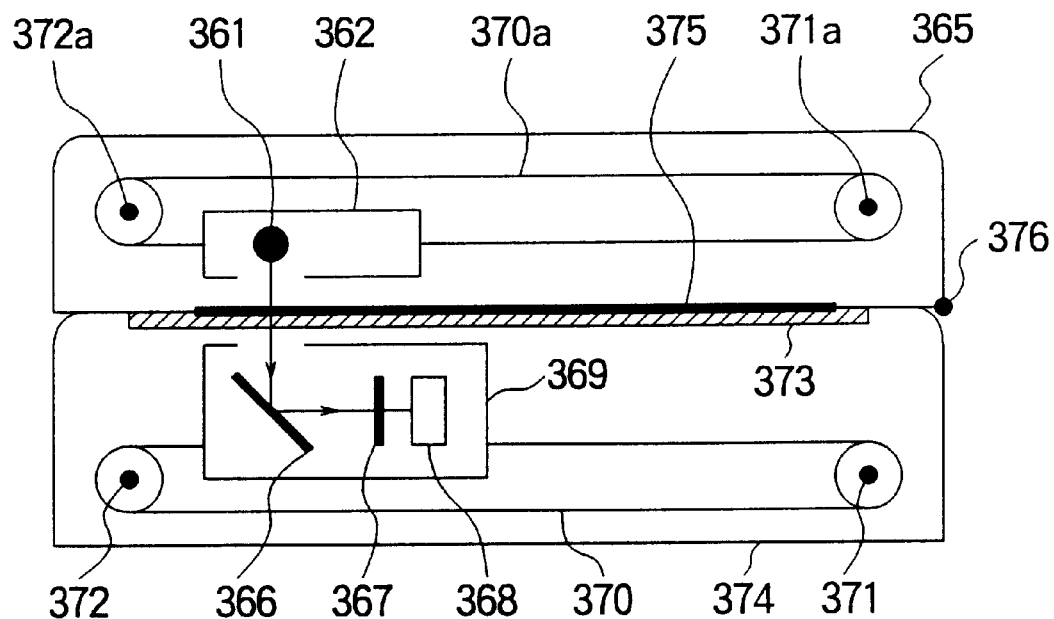
FIG. 23 is a view showing the mechanism of the prior art.
Figure 24:
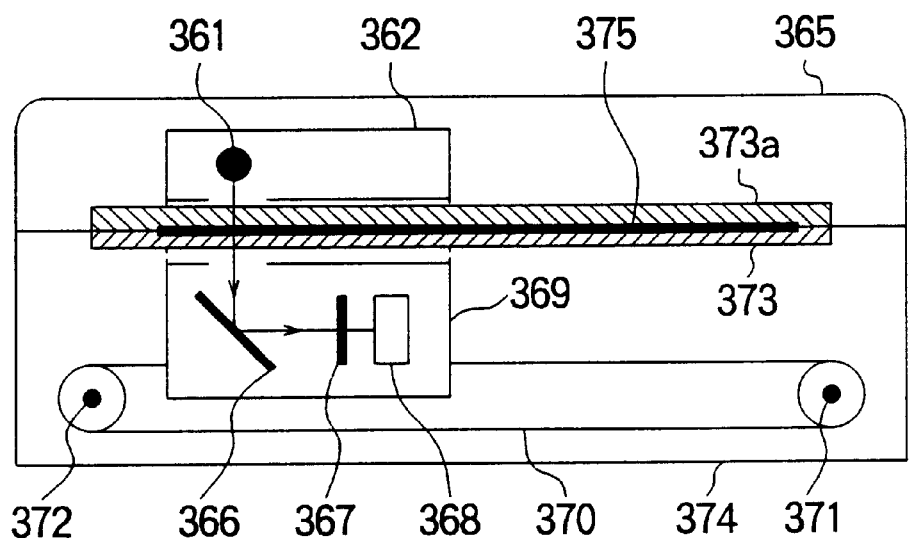
FIG. 24 is a view showing the mechanism of the prior art.
Figure 25:
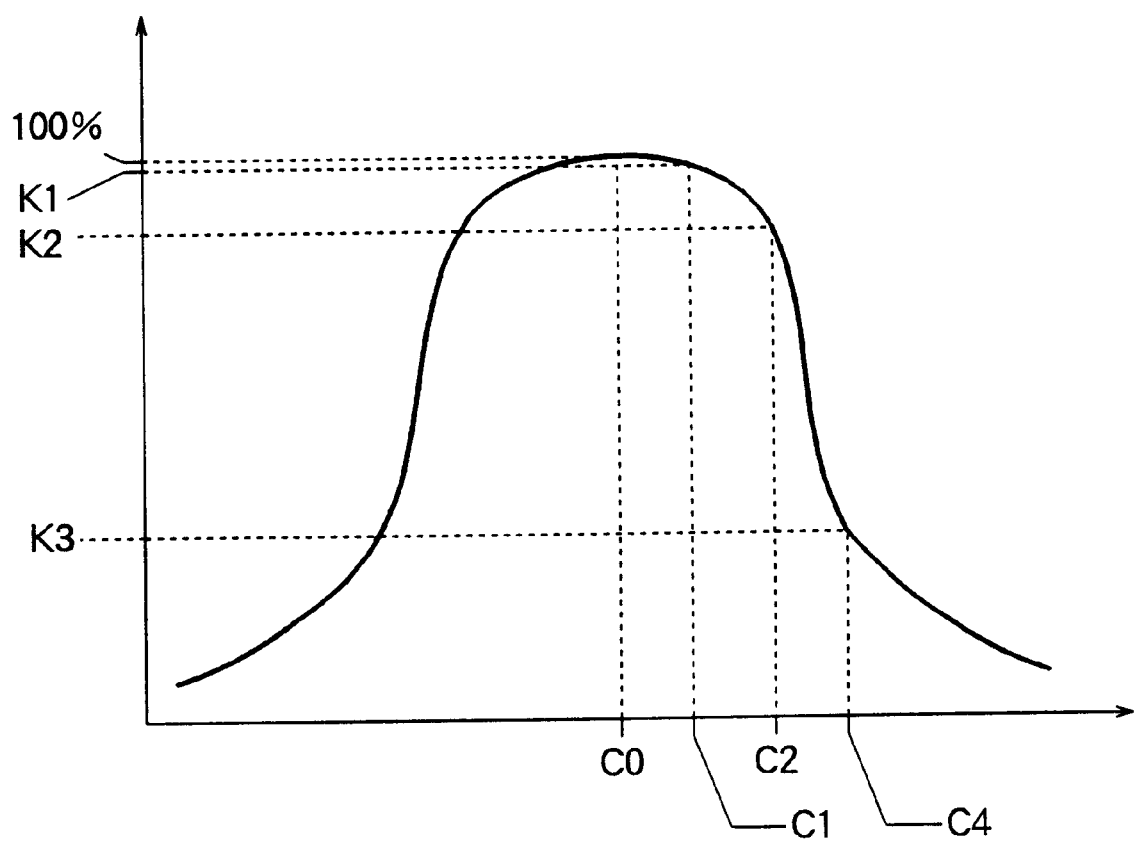
FIG. 25 is a graph for explaining an optical axis deviation and a value detected by a sensor.

The second embodiment will next be described in detail. FIG. 8 is a view for explaining the second embodiment. As shown in FIG. 8, the cover frame 53 of the original cover 42 has a portion having a shape of a lying squarish letter U into which the diffusion plate 46 is fitted and a portion into which the optical unit 44 is fitted. The gap 60 is formed between the cover frame 53 and the diffusion plate 45 when the diffusion plate 45 is fitted into the cover frame 53. The light source unit 44 may be the light source unit 254 of the conventional image reader of FIG. 21 or the light source unit 64 of FIGS.

10 and 11, which will be described later. When the light source unit 254 is attached to the cover frame 53, the diffusion plate 45 is vertically moved according to the thickness of the translucent original 41 to thereby maintain a constant distance between the original bed 51 and the light source 53.

Figure 9:
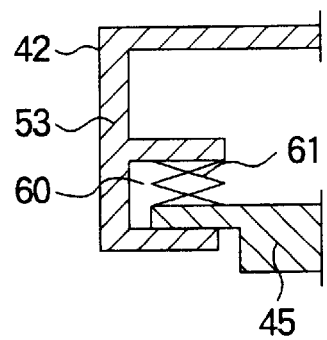
FIG. 9 is a view for explaining the second embodiment.

FIG. 9 is a view for explaining the second embodiment. As shown in FIG. 9, when the diffusion plate 45 is fitted into the gap 60 of FIG. 8, a pressing element 61 formed of a spring member is disposed on a top surface of the diffusion plate 45. The pressing element 61 is adapted to press the diffusion plate 45 toward the original bed.

Figure 10:
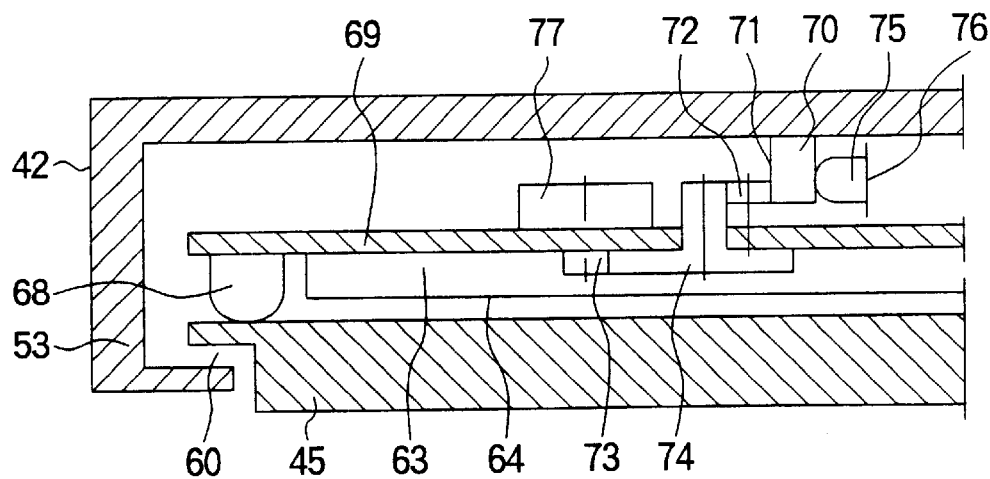
FIG. 10 is a view for explaining the second embodiment.

FIG. 10 is a view for explaining the second embodiment and shows a detailed structure of the original cover 42. The original cover 42 has a guide rail 70 extending in the subscanning direction and serving as a driving element for driving the light source unit 64. A rack 71 is formed at one side of the guide rail 70. To a unit frame 69 of the light source unit 64 are attached a light source 63, a pulse motor 77, and gears 73 and 74. Further, the light source unit 64 has a pinion 72, which is rotatably supported to be meshed with the rack 71. The pinion 72 is driven by the pulse motor 77 via the gears 73 and 74.

Two slide shoes 75 are provided on the light source unit 64 such that the slide shoes 75 are located on one side of the guide rail 70 opposite the rack-formed side thereof. The slide shoes 75 are pressed by means of pressing elements 76 so that the slide shoes 75 come in contact with the guide rail 70 at two positions located on opposite sides with respect to the meshing position between the rack 71 and the pinion 72. Thus, the two slide shoes 75 define the orientation of the light source unit 64.

Contact members 68 each formed of, for example, a sliding member are provided on opposite sides of the unit frame 69 of the light source unit 64 as viewed along the main scanning direction such that they abut the diffusion plate 45. The light source unit 64 travels on the basis of the diffusion plate 45.

The diffusion plate 45 is attached to the cover frame 53 while the gap 60 is formed therebetween so that the diffusion plate 45 is vertically movable in relation to the cover frame 53. In this example, the diffusion plate 45 is vertically moved according to the thickness of the translucent original 41 to thereby maintain a constant distance between the diffusion plate 45 and the light source 63.

FIG. 11 is a view for explaining the second embodiment. As shown in FIG. 11, when the light source unit 64 of FIG. 10 is attached to the cover frame 53, a pressing element 82 is disposed at a substantially central portion of the light source unit 64. The pressing element 82 is composed of a spring 83 and a contact member 81 which is formed of, for example, a sliding member and attached to one end of the spring 83. The pressing element 82 is adapted to press the light source unit 64 toward the diffusion plate 45.

According to the second embodiment as described above, the following effects are yielded.

The flat-bed-type image reader is composed of the apparatus body 50 and the original cover 42. The apparatus body 50 includes the read unit 102 and the original bed 51. The original cover 42 includes the light source 43 and the diffusion plate 45 and is attached to the apparatus body 50 such that the original cover 42 can be freely opened and closed. The distance between the light source 43 and the translucent original 41 placed on the original bed 51 is varied according the thickness of the translucent original 41. Since the light source 43 is arranged on the basis of the translucent original 41 placed on the original bed 51, the quantity of light impinging on the translucent original 41 becomes stable, thereby holding the quantity of light received by the CCD 105 at a constant level. Accordingly, there can be improved the quality of reading various kinds of translucent originals 41.

Further, the diffusion plate 45 is made movable toward the light source 43, or the diffusion plate 45 is attached to the cover frame 53 of the original cover 42 while the gap 60 is formed between the cover frame 53 and the diffusion plate 45. As a result, the diffusion plate 45 abuts the translucent original 41 under its own weight, thereby maintaining a constant distance between the light source 43 and various kinds of translucent originals 41.

Since the original cover 42 has the pressing element 46 for pressing the diffusion plate 45 toward the original bed 51, the diffusion plate 45 abuts the translucent original 41 under an external pressure. Even when the translucent original 41 warps against the weight of the diffusion plate 45, a constant distance can be maintained between the light source 43 and various kinds of translucent originals 41 by virtue of the external pressure.

The light source unit 64 having the light source 43 travels while abutting the diffusion plate 45. The light source unit 64 has the contact members 68, which abut the diffusion plate 45, at its opposite ends as viewed along the main scanning direction. As a result, the light source unit 64 can travel on the basis of the diffusion plate 45, and thus the quantity of light impinging on the translucent original 41 becomes stable, thereby maintaining the quantity of light received by the CCD 105 at a constant level. Accordingly, there can be improved the quality of reading various kinds of translucent originals 41.

Also, the light source unit 64 has the pressing member 82 located at its substantially central portion as viewed along the main scanning direction. The pressing member 82 includes the spring 83 having the contact member 81 and presses the cover frame 53 and the light source unit 64 apart from each other by means of the spring 83. Thus, the light source unit 64 can travel on the basis of the diffusion plate 45. The diffusion plate 45 abuts the translucent original 41 under an external pressure. Accordingly, even when the translucent original 41 warps against the weight of the diffusion plate 45, a constant distance can be maintained between the light source 43 and various kinds of translucent originals 41 by virtue of the external pressure.

Third Embodiment

The third embodiment employs the following means. First, before the image reader starts to read a translucent original, the position of an optical unit is controlled so as to align with the position of a light source unit, thereby establishing the optimum positional relationship between the optical unit and the light source unit. Thus, there can be set a reference value for correction of a read start position for the optical unit. Second, before the image reader starts to read the translucent original, a qualitative positional deviation involved in scanning performed by the light source unit is detected to thereby calculate a correction value for a read start position of the optical unit. Thus, there can be calculated a correction value used for correcting the read start position of the optical unit.

The present invention is carried out in the following third embodiment. As shown in FIGS. 12 to 16, the image reader includes a driving system for effecting scanning performed by the light source unit 44 in order to read the translucent original 41 and a driving system for effecting scanning performed by the optical unit (or read unit) 102 in order to obtain an image signal. The driving system for effecting scanning performed by the light source unit 44 is operated as needed. When the translucent original 41 is to be read, the position of the optical unit 102 is adjusted and corrected in relation to the light source unit 44 situated at a read start position, thereby aligning the optical axis of the optical unit 102 with that of the light source unit 44 situated at the read start position. Next, preliminary reading is performed. At a position where preliminary reading ends, the position of the optical unit 102 is adjusted so as to obtain a position where the optical axis of the optical unit 102 aligns with that of the light source unit 44 situated at the read start position. Thus is obtained a cumulative deviation of the optical axis involved in preliminary reading. Next, the position of the optical unit 102 which was determined through the initial correction is shifted in reverse in relation to the direction of deviation observed in preliminary reading in an amount of half the cumulative deviation of the optical axis obtained in preliminary scanning. Half of the cumulative deviation is used as a correction value for a read start position in subsequent reading performed by the optical unit 102. The thus-obtained correction value is stored in an EEPROM section B22 contained in the image reader.

Thus, when the image reader starts to read the translucent original 41, the scanning start position of the optical unit 102 can be corrected according to the scanning start position of the light source unit 44 and the accuracy of scanning movement of the light source unit 44.

The third embodiment will next be described in detail with reference to FIGS. 12 to 17.

Figure 12:
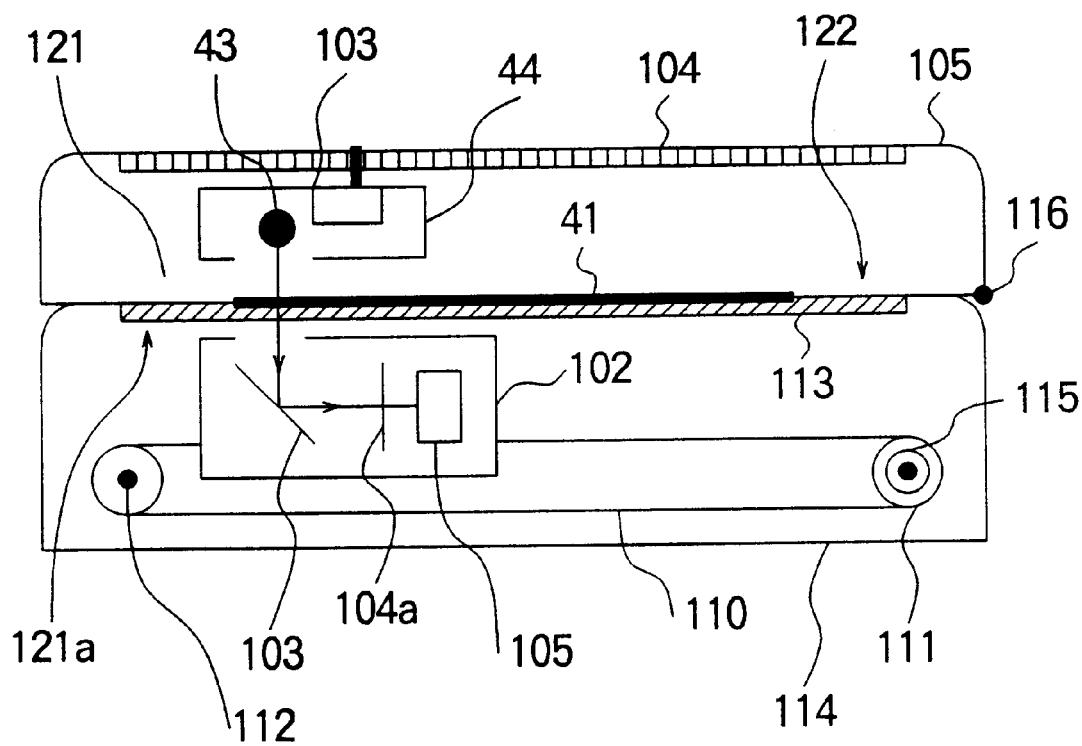
FIG. 12 is a view showing the mechanism of a third embodiment.

FIG. 12 shows the configuration of the image reader according to the third embodiment. The image reader is composed of an upper housing 105 and a lower housing 114. The upper housing 105 is attached to the lower housing 114 by means of a hinge 116 so that the upper housing 105 can be freely opened and closed. The upper housing 105 serves as the housing of the original cover 42. The lower housing 114 serves as the housing of the apparatus body 50.

The upper housing 105 accommodates the light source unit 44. When the image reader is instructed to read the translucent original 41, a drive 103 contained in the light source unit 44 causes the light source unit 44 to move by means of a rack 104 fixed to the upper housing 105.

The translucent original 41 is placed on a transmission glass 113 fixed onto a top surface of the lower housing 114 and irradiated with light emitted from the light source 43 contained in the light source unit. The optical unit 102 accommodated in the lower housing 114 includes a reflecting mirror 103, a condenser lens (or image-forming lens) 104a, and a CCD 105. The reflecting mirror 103 redirects the optical axis of light which has passed through the translucent original 41. The CCD 105 receives light which has passed through the translucent original 41.

A driving pulley 111 provided within the lower housing 114 has a pulse motor 115 serving as a drive. The output shaft of the pulse motor 115 is coupled with the driving pulley 111 directly or via predetermined gears (not shown). A driving belt 110 looped around and extending between the driving pulley 111 and a follower pulley 112 causes the optical unit 102 to move.

A starting fixed point 121 and an end fixed point 122 are located outside the range of the translucent original 41. The light source 43 is situated at the starting fixed point 121 or the end fixed point 122 as needed so that light passes only through the transmission glass 113 and impinges on the optical unit 102.

Figure 13:
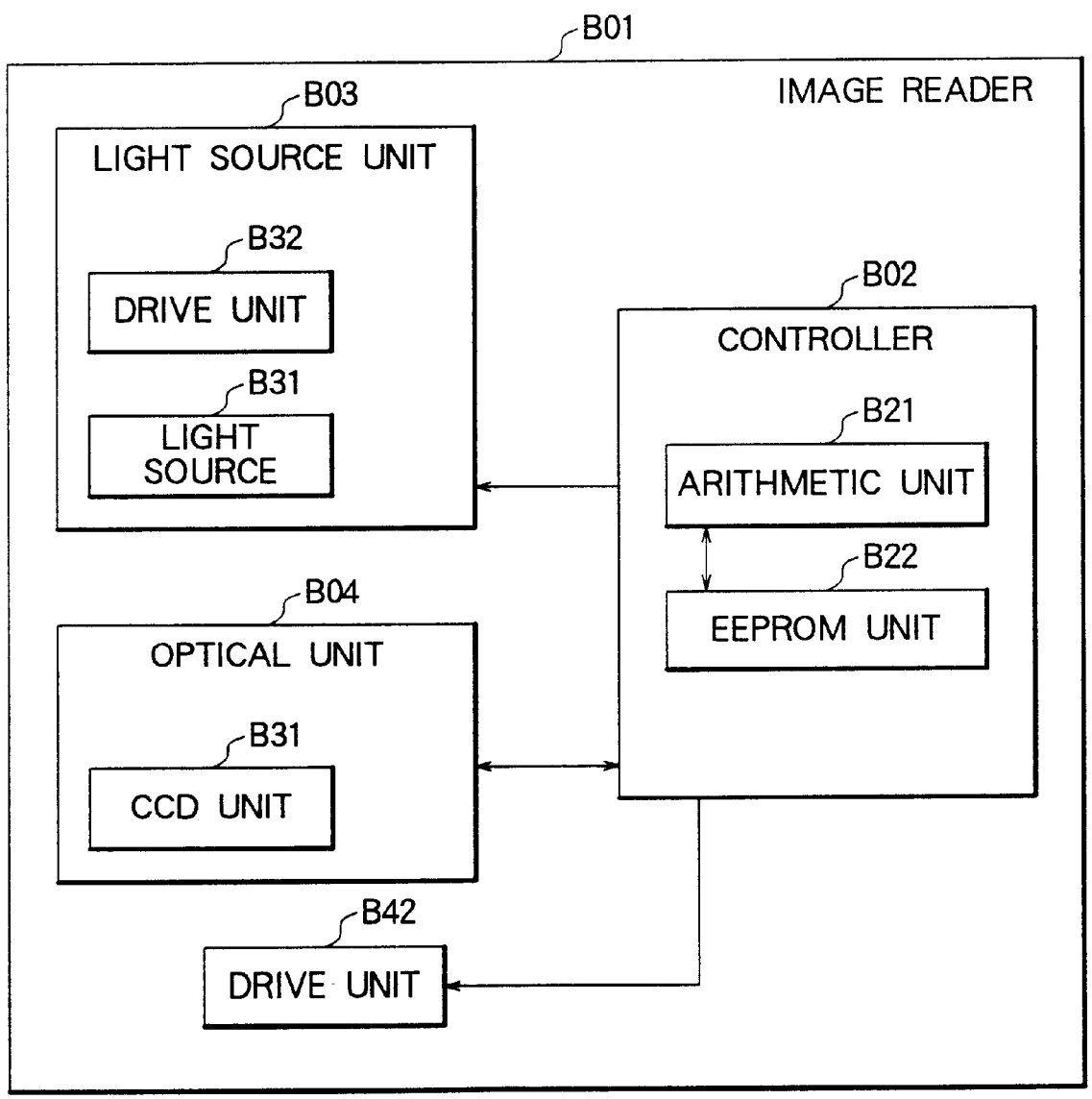
FIG. 13 is a block diagram according to the third embodiment.

FIG. 13 is a block diagram showing the configuration of the third embodiment. An image reader B01 includes a controller B02, a light source unit B03, an optical unit B04, and a drive unit B42 for driving the optical unit B04. The controller B02 includes an arithmetic unit B21 and an EEPROM unit B22. The light source unit B03 includes a light source B31 and a drive unit B32.

Figure 14:
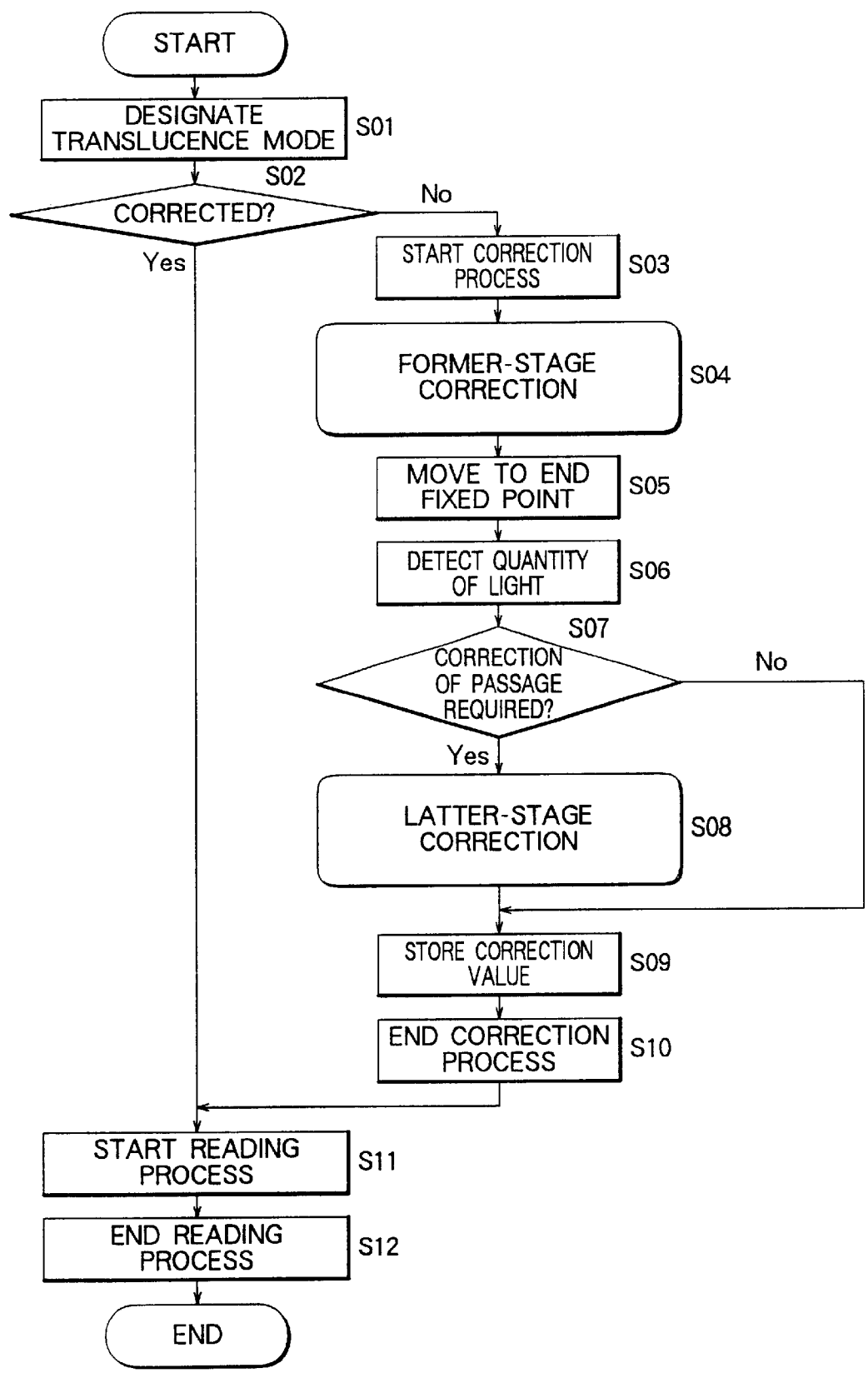
FIG. 14 is a flow chart according to the third embodiment.

A control flow for correction of the optical unit according to the present invention will next be described with reference to FIG. 14.

In step S01, the arithmetic unit B21 is instructed to read the translucent original 41. Proceeding to step S02, the arithmetic unit B21 checks the EEPROM unit B22. Confirming that a correction value is already stored in the EEPROM unit B22, the arithmetic unit B21 proceeds to step S11 and starts to read the translucent original 41 using the correction value. When the reading process is completed in step S12, the arithmetic unit B21 ends the reading operation.

If, in step S02, the arithmetic unit B21 finds that no correction value is stored in the EEPROM unit B22, the arithmetic unit B21 proceeds to step S03 and starts a correction process, followed by former-stage correction in step S04.

Figure 15:
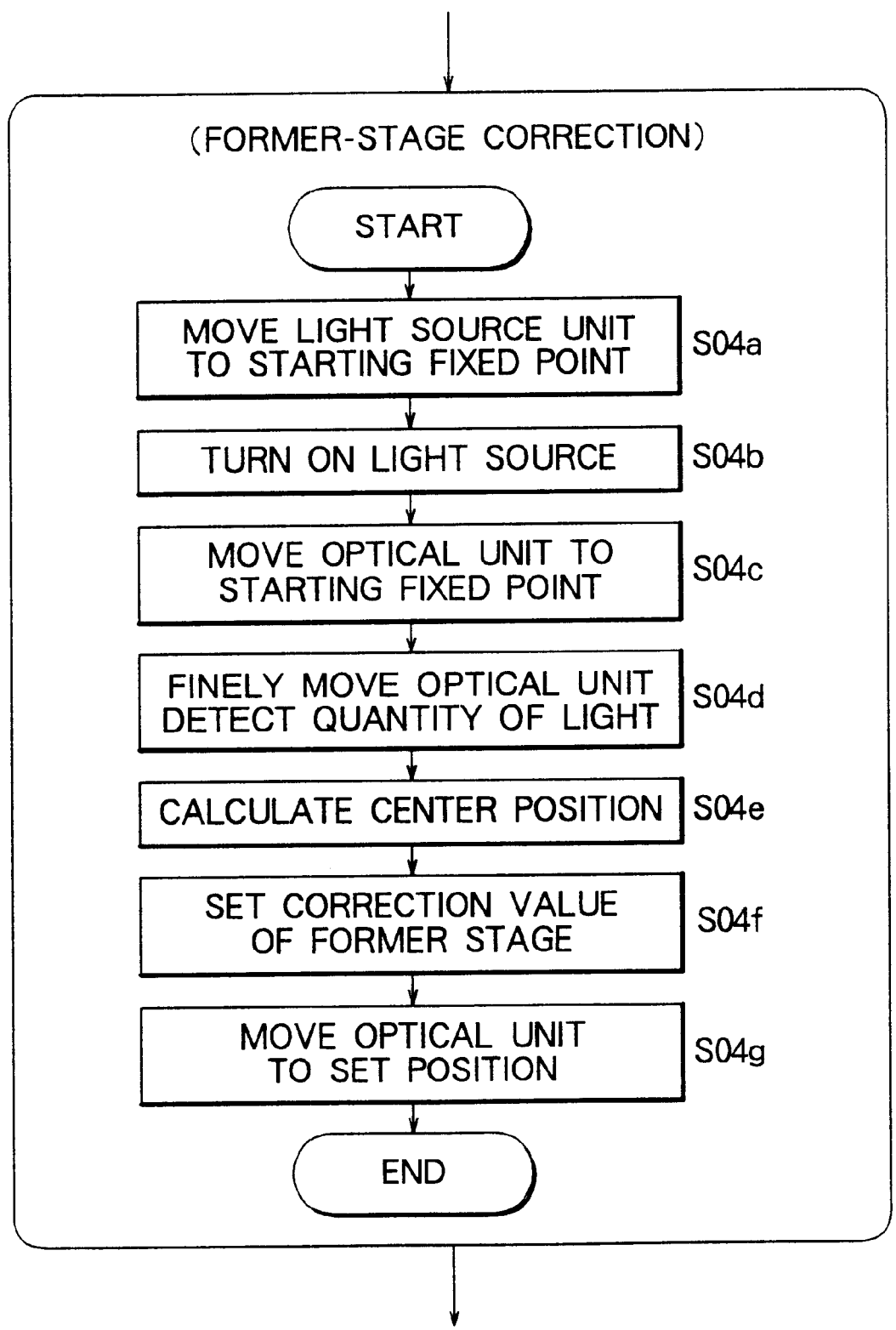
FIG. 15 is a flow chart according to the third embodiment.

Former-stage correction in step S04 will next be described in detail with reference to FIG. 15. In step S04a, the arithmetic unit B21 causes the light source unit B03 to move to the starting fixed point 121 (see FIG. 12). In step S04b, the arithmetic unit B21 causes the light source B31 to be turned on.

In step S04c, the arithmetic unit B21 causes the optical unit B04 to move to a starting fixed point 121a (see FIG. 12). The starting fixed point 121 and the starting fixed point 121a are shifted from each other.

In step S04d, the arithmetic unit B21 causes the optical unit B04 to finely move, and measures in a comparative manner the number of pulses (cumulative pulses) of the pulse motor 115 required for the movement of the optical unit B04 and an associated variation of the quantity of light detected by a CCD unit B41. In step S04e, the arithmetic unit B21 calculates a center value at which the optical axis of the optical unit B04 aligns with that of the light source unit B03.

A process of variation in the quantity of light detected by the CCD unit B41 will next be described with reference to FIG. 17A.

Figure 17A:
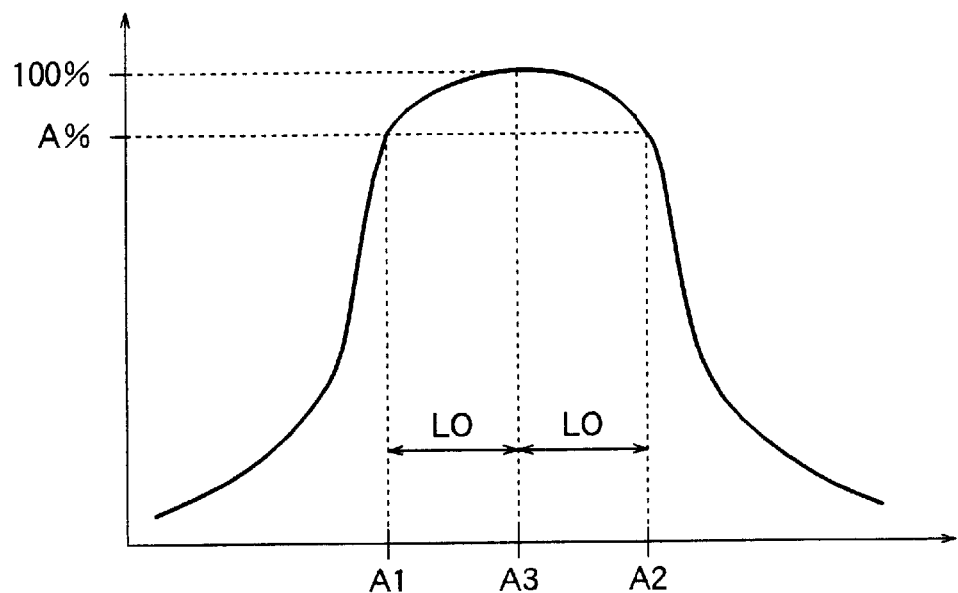
FIGS. 17A & 17B are graphs for explaining an optical axis deviation and a value detected by a sensor.

When, as described above, the starting fixed point 121a (see FIG. 12), at which the optical unit B04 is currently positioned, aligns with the starting fixed point 121 (see FIG. 12), at which the light source unit B03 is positioned, the optical unit B04 is positioned at a point A3 of FIG. 17A. Thus, the quantity of light detected by the CCD unit B41 becomes 100%. However, in actuality, since the optical unit B04 is positioned at a point A1, the quantity of light detected by the CCD unit B41 is A%.

As the optical unit B04 is finely moved from the point A1 toward the point A3, the quantity of light detected by the CCD unit B41 increases and then peaks when the optical unit B04 reaches the point A3. As the optical unit B04 is further moved beyond the point A3, the quantity of light detected by the CCD unit B41 begins to decrease and then decreases to the initial A% when the optical unit B04 reaches the point A2, followed by continuous decrease. Since the curve of FIG. 17A is symmetrical, a distance of L0 between the starting fixed point 121a (see FIG. 12) and the starting fixed point 121 (see FIG. 12) can be calculated from the number of pulses of the pulse motor 115 as counted over the movement from the point A1 to the point A3.

In step S04f, using a distance of L0 as a correction value for setting the starting fixed point 121 for the optical unit B04, the arithmetic unit B21 sets the starting fixed point 121 of the optical unit B04, where the optical axis of the optical unit B04 aligns with that of the light source unit B03.

In step S04g, the arithmetic unit B21 causes the optical unit B04 to move from the starting fixed point 121a to the corrected starting fixed point 121, thus ending the former-stage correction operation.

Proceeding to step S05 (FIG. 14), the arithmetic unit B21 causes the light source unit B03 and the optical unit B04 to move synchronously with each other. The light source unit B03 and the optical unit B04 reach an end fixed point 122 (see FIG. 12).

In step S06, the arithmetic unit B21 detects the quantity of light detected by the CCD unit B41. In step S07, the arithmetic unit B21 compares the detected quantity of light with the quantity of light detected in the starting fixed point 121. When the difference falls within a predetermined range, the arithmetic unit B21 judges that a cumulative deviation associated with the scanning movement is too small to require correction, and proceeds to step S09. In step S09, the arithmetic unit B21 stores in the EEPROM unit B22 the correction value obtained in the former stage. In Step S10, the arithmetic unit B21 ends the correction process.

In step S07, if the above-mentioned difference is in excess of the predetermined range, the arithmetic unit B21 proceeds to step SOS and carries out latter-stage correction.

Figure 16:
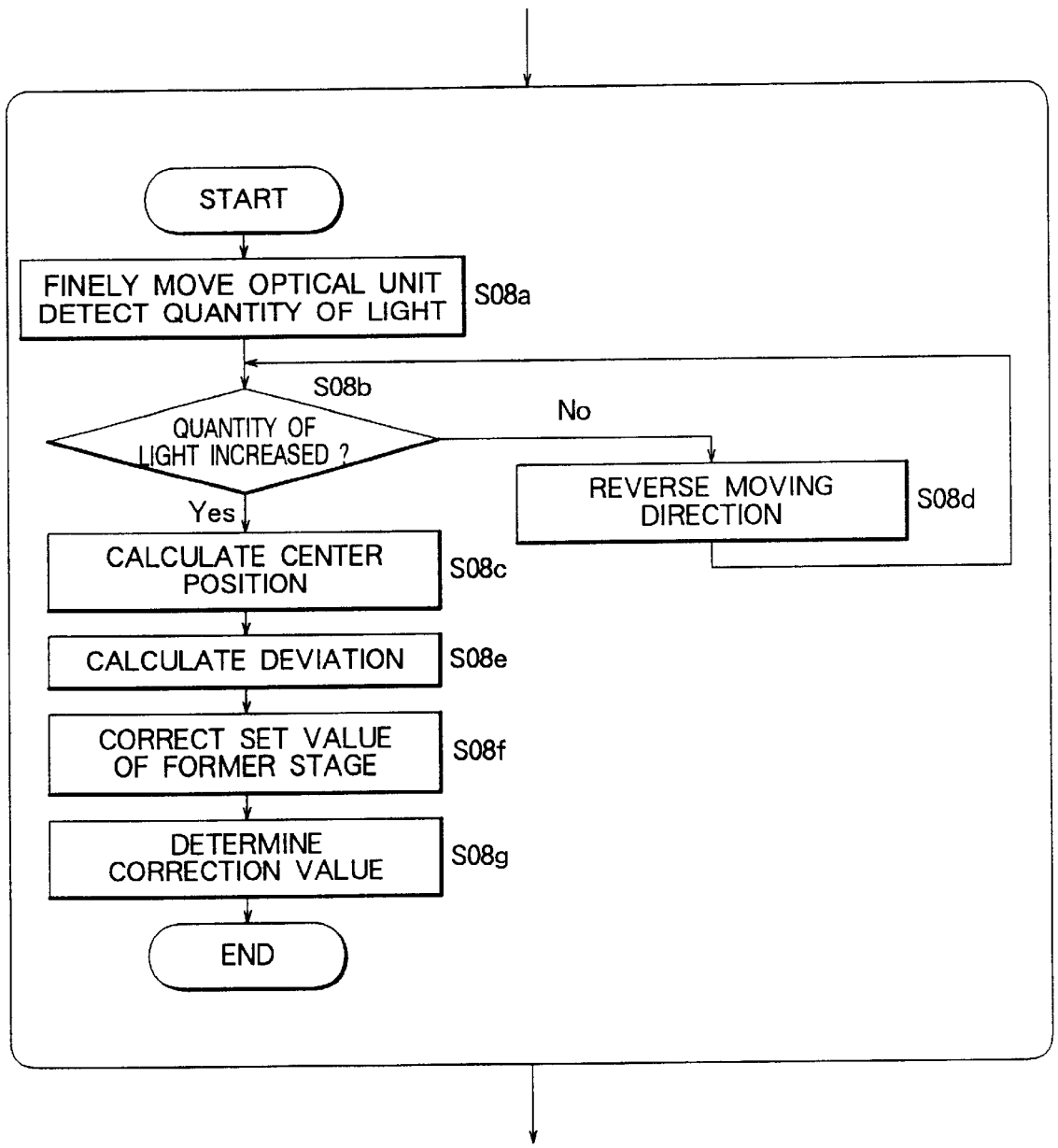
FIG. 16 is a flow chart according to the third embodiment.

Latter-stage correction in step S08 will next be described in detail with reference to FIG. 16. In step S08a, the arithmetic unit B21 causes the optical unit B04 to finely move while the light source unit B03 is held stationary, and measures in a comparative manner the number of pulses of the pulse motor 115 required for the movement of the optical unit B04 and an associated variation of the quantity of light detected by the CCD unit B41. When, in step S08b, the detected quantity of light shows a tendency to increase, the arithmetic unit B21 proceeds to step S08c and lets the optical unit B04 continue the fine movement. When, in step S08b, the detected quantity of light shows a tendency to decrease, the arithmetic unit B21 proceeds to step S08d and causes the direction of the fine movement to reverse.

In step S08e, the arithmetic unit B21 calculates a center value at which the optical axis of the optical unit B04 aligns with that of the light source unit B03.

A process of variation in the quantity of light detected by the CCD unit B41 will next be described with reference to FIG. 17B.

Figure 17B:
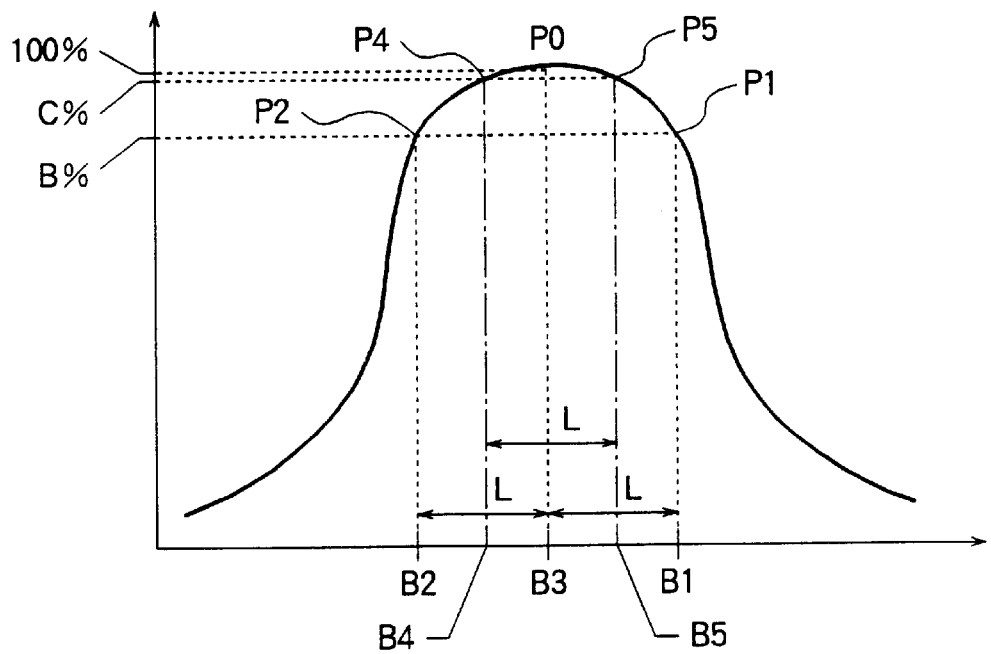

According to FIG. 17B, when the optical unit B04 and the light source unit B03 reach the end fixed point 122, due to a cumulative deviation associated with the scanning movement of the light source unit B03, a stop position of the light source unit B03 deviates by, for example, a distance of L from that of the optical unit B04.

When the quantity of light detected by the CCD unit B41 is taken as 100% in the case where the optical axis of the optical unit B04 aligns with a point B3 of the optical axis of the light source unit B03, the quantity of light detected at a point B1 is B%.

While the light source unit B03 is held stationary, the optical unit B04 is finely moved in such a direction that variation in the quantity of light detected by the CCD unit B41 shows a tendency to increase. The distance of movement of the optical unit B04 can be calculated based on the rotational direction and the number of pulses of the pulse motor 115 required for the movement. When the optical axis of the optical unit B04 moves from the point B1 and reaches the point B3, the quantity of light detected by the CCD unit B41 becomes maximum. Then, when the optical axis of the optical unit B04 moves further and reaches a point B2, the quantity of light detected by the CCD unit B41 returns to the initially detected quantity of light.

Accordingly, when the distance between the point B1 and the point B2 is taken as 2L, half the distance, or a distance of L, is recognized as the distance between the point B1 and the point B3. Further, a distance of L is the cumulative deviation associated with the synchronous scanning movement of the optical unit B04 and the light source unit B03 from the starting fixed point 121 to the end fixed point 122. This indicates that, in the scanning movement, the quantity of light detected by the CCD unit B41 decreases along the curve extending from P0 to P1.

Next, in step S08f, the arithmetic unit B21 calculates half a distance of L, or a distance of L/2, and corrects by a distance of L/2 the scanning start position of the optical unit B04 which was set in the former-stage correction step.

The correction of the scanning start position of the optical unit B04 which was set in the former-stage correction step will next be described with reference to FIG. 17B.

In the process of scanning the translucent original 41 by the image reader, a cumulative positional deviation between the light source unit B03 and the optical unit B04 is known to be a distance of L. That is, when the optical axis of the light source unit B03 is aligned with that of the optical unit B04 at the time of starting scanning, the optical axes result in a deviation of a distance of L upon end of scanning.

To cope with the above problem, before scanning is started, the set position of the optical unit B04 is shifted in reverse in relation to the direction of the deviation by half a distance of L, or a distance of L/2. Specifically, as shown in FIG. 17B, when the image reader starts reading the translucent original 41, the optical unit B04 is shifted by a distance of L/2 from the position which was set in the former-stage correction step, to thereby situate the optical unit B04 at the point B4 in relation to the optical-axis position B3 of the light source unit B03. A distance of L/2 is used as a correction value.

Through the above-mentioned process, the quantity of light detected by the CCD unit B41 moves along the curve which starts at P4 and reaches P5 via PO. Accordingly, the quantity of light detected by the CCD unit B41 increase a from C% to 100% and then decreases to the initial C%.

Next, in step S08g, the arithmetic unit B21 determines a correction value for the set value of the former stage and ends the latter-stage correction step.

Proceeding to step S09 (FIG. 14), the arithmetic unit B21 stores the correction value in the EEPROM unit B22. The correction value stored in the EEPROM unit B22 is retained until the light source B31 is replaced.

In step S10, the arithmetic unit B21 ends the correction process and proceeds to step S11 to start scanning the translucent original 41 for reading information therefrom.

In step S12, the arithmetic unit B21 ends the reading operation.

According to the third embodiment as described above, the following effects are yielded.

The image reader includes the driving system for effecting scanning performed by the light source unit 44 in order to read the translucent original 41 and the driving system for effecting scanning performed by the optical unit 102 in order to obtain an image signal. The driving system for effecting scanning performed by the light source unit 44 is operated as needed. When the translucent original 41 is to be read, the position of the optical unit 102 is adjusted and corrected in relation to the light source unit 44 situated at the read start position where reading the translucent original 41 starts, thereby aligning the optical axis of the optical unit 102 with that of the light source unit 44 situated at the read start position. Next, preliminary reading is performed. At a position where preliminary reading ends, the position of the optical unit 102 is adjusted so as to obtain a position where the optical axis of the optical unit 102 aligns with that of the light source unit 44 situated at the read start position. Thus is obtained a cumulative deviation of the optical axis involved in preliminary reading. Next, the position of the optical unit 102 which was determined through the initial correction is shifted in reverse in relation to the direction of deviation observed in preliminary reading in an amount of half the cumulative deviation of the optical axis obtained in preliminary scanning. Half of the cumulative deviation is used as a correction value for a read start position in subsequent reading performed by the optical unit 102. The thus-obtained correction value is stored in the EEPROM unit contained in the image reader.

Accordingly, when a mode for reading a translucent original is designated, an optical-axis deviation is minimized through correction of the read start position of the optical unit 102, whereby a reduction in the quantity of light caused by the optical-axis deviation can fall within a range which does not affect practical reading.

The above-mentioned correction value is stored in the image reader and reproduced in repeated scanning operation. Correction is automatically renewed as needed, thereby enabling optimum scanning for read.

Industrial Applicability

As described above, according to the present invention, an image reader for reading an image through self-advancement of a read unit provided with a reducing optical system employing an image-forming lens is composed of a read unit provided with a contact member which abuts an original placement bed of a flat bed unit, and a pressing element for causing the read unit and the original bed to press against each other. Thus, the original can be scanned while the read unit always abuts the original bed by virtue of the pressing element. As a result, the distance between the read unit and the original bed can always be held constant. Accordingly, the optical path length between the original bed and a CCD becomes stable, thereby eliminating defocus which would otherwise occur during scanning. Further, even when the entire image reader is distorted, there can be eliminated a positional shift (skew) between a read start position and a read end position which would otherwise result.

Also, according to the present invention, a flat-bed-type image reader comprises an apparatus body and an original cover. The apparatus body includes a read unit and an original bed. The original cover includes a light source and a diffusion plate and is attached to the apparatus body in such a manner as to be freely opened and closed. The distance between a translucent original placed on the original bed and the light source is variable according to the thickness of the translucent original. Thus, the light source can be arranged on the basis of the translucent original placed on the original bed, whereby the quantity of light impinging on the translucent original can be stabilized, and the quantity of light received by the CCD can be stably held at a constant level. Accordingly, there can be improved the quality of reading various kinds of translucent originals.

Further, according to the present invention, an image reader includes a driving system for effecting scanning performed by a light source unit in order to read a translucent original and a driving system for effecting scanning performed by an optical unit in order to obtain an image signal. The driving system for effecting scanning performed by the light source unit is operated as needed. Preliminary reading is performed to obtain a cumulative deviation of an optical axis. Half of the cumulative deviation is used as a correction value for a read start position in subsequent reading. As a result, when a translucent original is to be read, an optical-axis deviation is minimized through correction of the read start position of the optical unit, whereby a reduction in the quantity of light caused by the optical-axis deviation can fall within a range which does not affect practical reading.

What is claimed is:

1. A flat-bed-type image reader, comprising:

an apparatus body including a read unit and an original bed on which to place a translucent original, the read unit traveling in a subscanning direction and including a CCD; and an original cover, which is attached to the apparatus body in such a manner as to be freely opened and closed, the original cover comprising a light source unit having a light source to irradiate the translucent original that is on the original bed and traveling in the subscanning direction synchronously with the read unit;

a diffusion plate to diffuse light from the light source and being attached to the original cover in a vertically movable manner so as to be able to abut the translucent original that is on the original bed; and a first pressing element to press the diffusion plate toward the original bed, wherein the light source unit comprises first contact members that abut the diffusion plate and that are located at opposite ends of the diffusion plate as viewed along a main scanning direction; and a second pressing element over the light source unit to press the light source unit and diffusion plate toward the original bed, and wherein the light source unit travels in the subscanning direction synchronously with the read unit while abutting the diffusion plate, which abuts the translucent original that is on the original bed, when the read unit reads the translucent original that is on the original bed.

2. The flat-bed-type image reader of claim 1, further comprising:

a flat bed unit that includes the original bed; and a third pressing element to cause the read unit and the original bed to press against each other, wherein the read unit comprises a second contact member that abuts the original bed; and a reducing optical system that includes a image-forming lens, and wherein the read unit reads an image through self-advancement.

3. The flat-bed-type image reader of claim 2, wherein said flat bed unit includes a guide rail, and wherein said second contact member abuts under pressure said guide rail.

4. The flat-bed-type image reader of claim 3, wherein said flat bed unit includes a first spring member, and wherein said second contact member, which is attached to said read unit in a rotatable and slidable manner, is pressed against said guide rail by said first spring member.

5. The flat-bed-type image reader of claim 3, wherein said flat bed unit includes a second spring member, and wherein said second contact member is attached to said second spring member of said read unit to press said guide rail.

6. The flat-bed-type image reader of claim 3, wherein said read unit includes a frame, and wherein said second contact member is made of an elastic resin material used to form said frame of said read unit and is pressed against said guide rail.

7. The flat-bed-type image reader of claim 2, wherein said original bed is attached to said flat bed unit in a vertically slidable manner.

8. The flat-bed-type image reader of claim 7, wherein said flat bed unit includes support posts to define the position of said original bed in a main scanning direction and in a subscanning direction, and said original bed is attached to said support posts.

9. The flat-bed-type image reader of claim 1, wherein said diffusion plate is movable toward said light source.

10. The flat-bed-type image reader of claim 9, wherein said original cover includes a cover frame, and wherein said diffusion plate is attached to said cover frame such that a gap is defined by said cover frame and said diffusion plate.

11. The flat-bed-type image reader of claim 1, wherein said original cover includes a pressing element for pressing said diffusion plate toward said original bed.

12. The flat-bed-type image reader of claim 1, wherein a light source unit having said light source is adapted to travel while abutting said diffusion plate.

13. The flat-bed-type image reader of claim 12, wherein said light source unit includes contact members abutting said diffusion plate and located at opposite ends thereof as viewed along a main scanning direction.

14. The flat-bed-type image reader of claim 1, wherein said light source unit includes a pressing element for pressing said diffusion plate.

15. The flat-bed-type image reader of claim 1, wherein said light source unit includes a fourth pressing member located at a substantially central portion thereof as viewed along the main scanning direction and being provided with a third spring member having a third contact member, said fourth pressing member pressing said cover frame and said light source unit apart from each other by said third spring member and said third contact member.

16. A method for controlling a flat-bed-type image reader that includes a light source unit having a light source to irradiate an original placed on a transmission glass with light and an optical unit to receive light which has passed through said original, the method comprising:

reading a cumulative difference between the movement of said optical unit and the movement of said light source unit; and shifting a relative position of said optical unit and said light source unit in reverse in relation to a direction of said cumulative difference so as to reduce an optical-axis deviation which arises during scanning, at the time of a start of scanning to read.

17. The method for controlling a flat-bed-type image reader of claim 16, wherein, at the time of start of said scanning to read, a scanning start point of said optical unit is changed so as to obtain from an output value of said optical unit a position where an optical-axis deviation is minimized, wherein, at the time of end of said scanning to read, a scanning end point of said optical unit is changed so as to obtain from an output value of said optical unit a position where an optical-axis deviation is minimized, wherein a cumulative deviation produced during said scanning to read is obtained from said positions, and wherein the scanning start point of said optical unit is shifted in reverse in relation to a direction of said cumulative deviation in an amount of half said cumulative deviation so that the shifted point is set as the scanning start point of said optical unit.

* * * * *

UNITED STATES PATENT AND TRADEMARK OFFICE
CERTIFICATE OF CORRECTION

PATENT NO. : 6,628,431 B1  Page 1 of 1
DATED : September 30, 2003
INVENTOR(S) : Minoru Masuda et al.

It is certified that error appears in the above-identified patent and that said Letters Patent is hereby corrected as shown below:

<u>Title page, Item [54] and Column 1, lines 1-2,</u>
Title, replace with -- IMAGE READER AND METHOD FOR CONTROLLING THE IMAGE READER --.

<u>Column 1,</u>
Line 42, change "error S" to -- error $\delta$ --.

<u>Column 3,</u>
Line 1, change "flatbed" to -- flat-bed --.

<u>Column 4,</u>
Line 64, change "self advancement" to -- self-advancement --.

<u>Column 5,</u>
Lines 56 and 57, change "is a view" to -- are views --.

<u>Column 8,</u>
Line 21, change "self" to -- self- --.

<u>Column 9,</u>
Line 61, after "constant level." start a new paragraph.

Signed and Sealed this

Twenty-second Day of June, 2004

JON W. DUDAS
*Acting Director of the United States Patent and Trademark Office*